Oct. 23, 1962    H. M. KUMAGAI ET AL    3,059,388
PACKAGING APPARATUS AND PROCESS
Filed Jan. 30, 1961    20 Sheets-Sheet 1
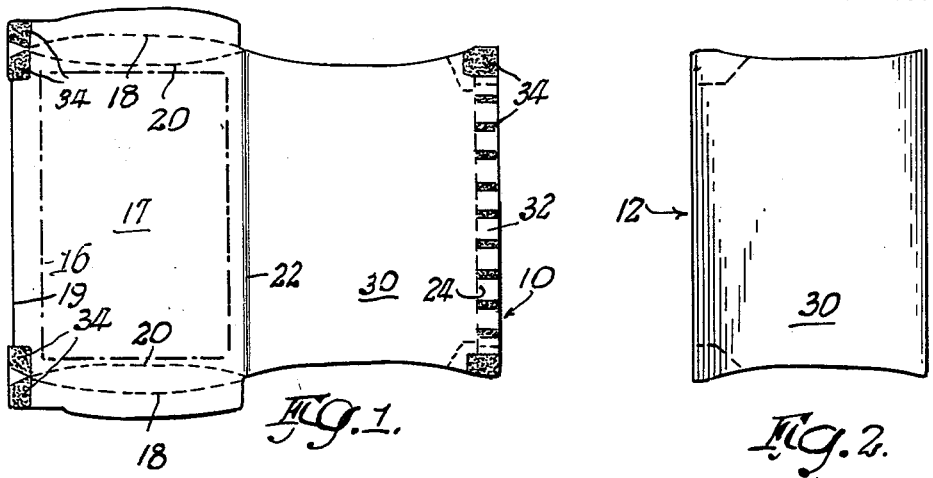
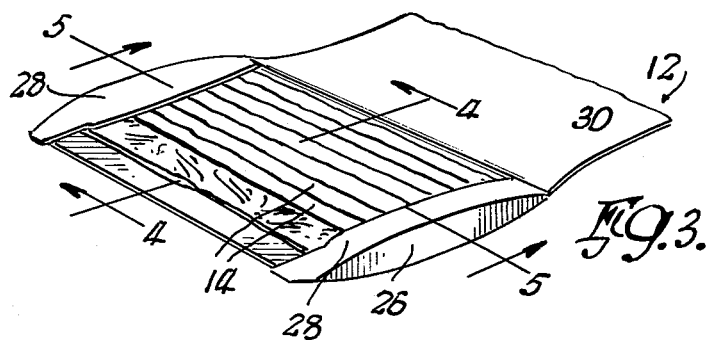
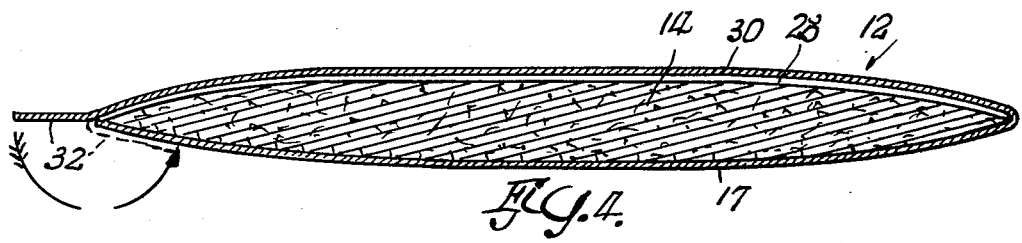
Inventors
Harry M. Kumagai
Thomas B. Shiu
Olson, Mecklenburger, von Holst
Pendleton & Neuman
Attys

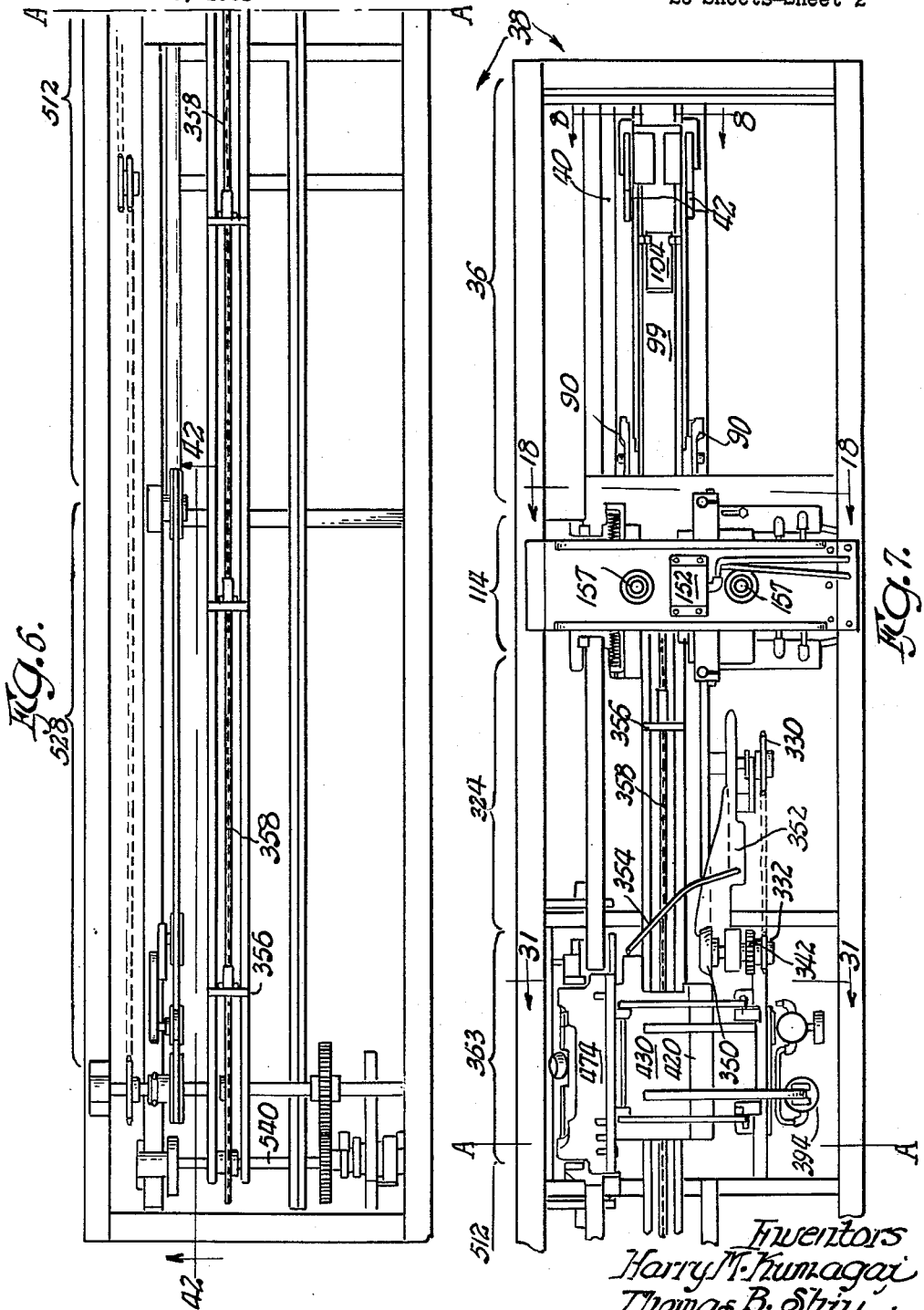

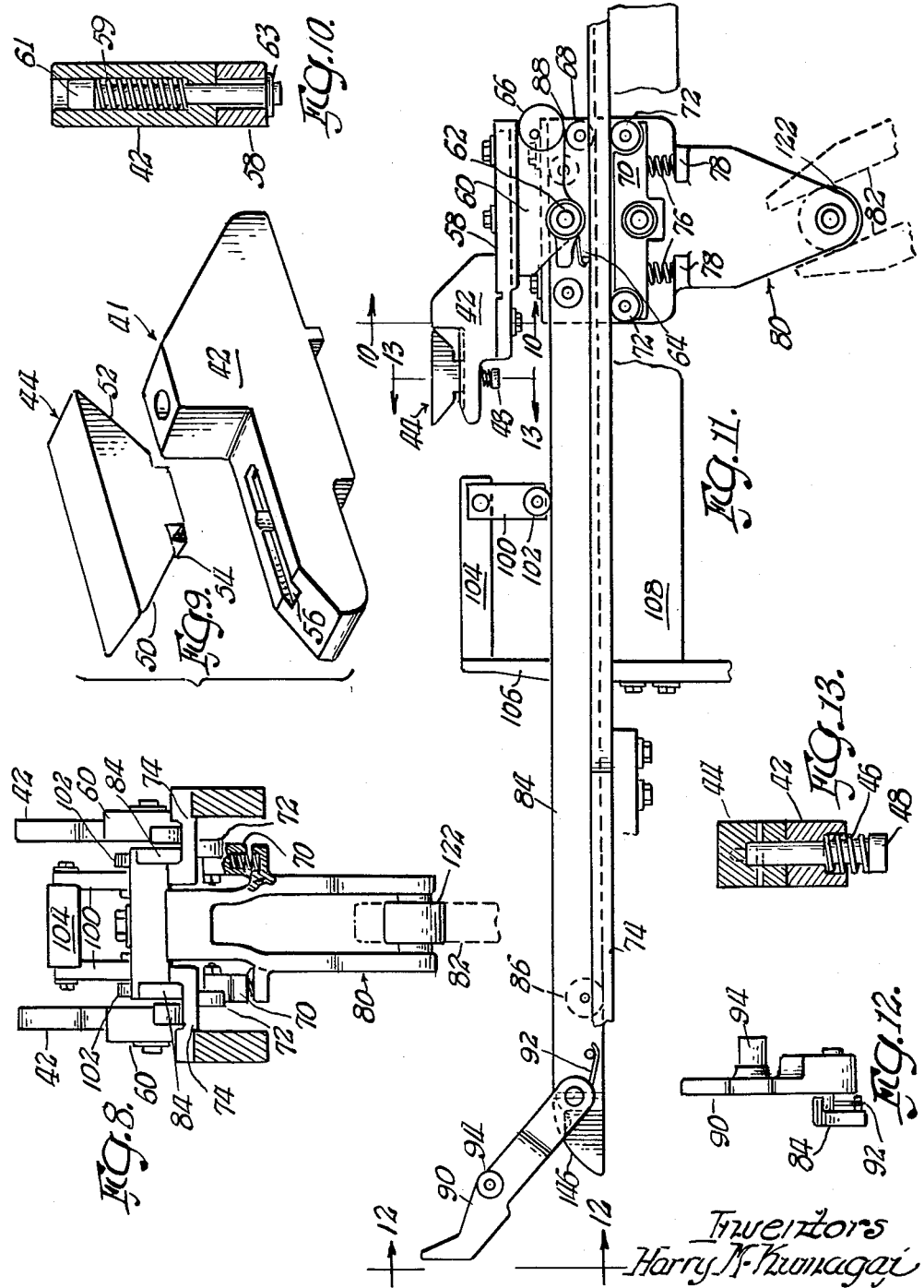

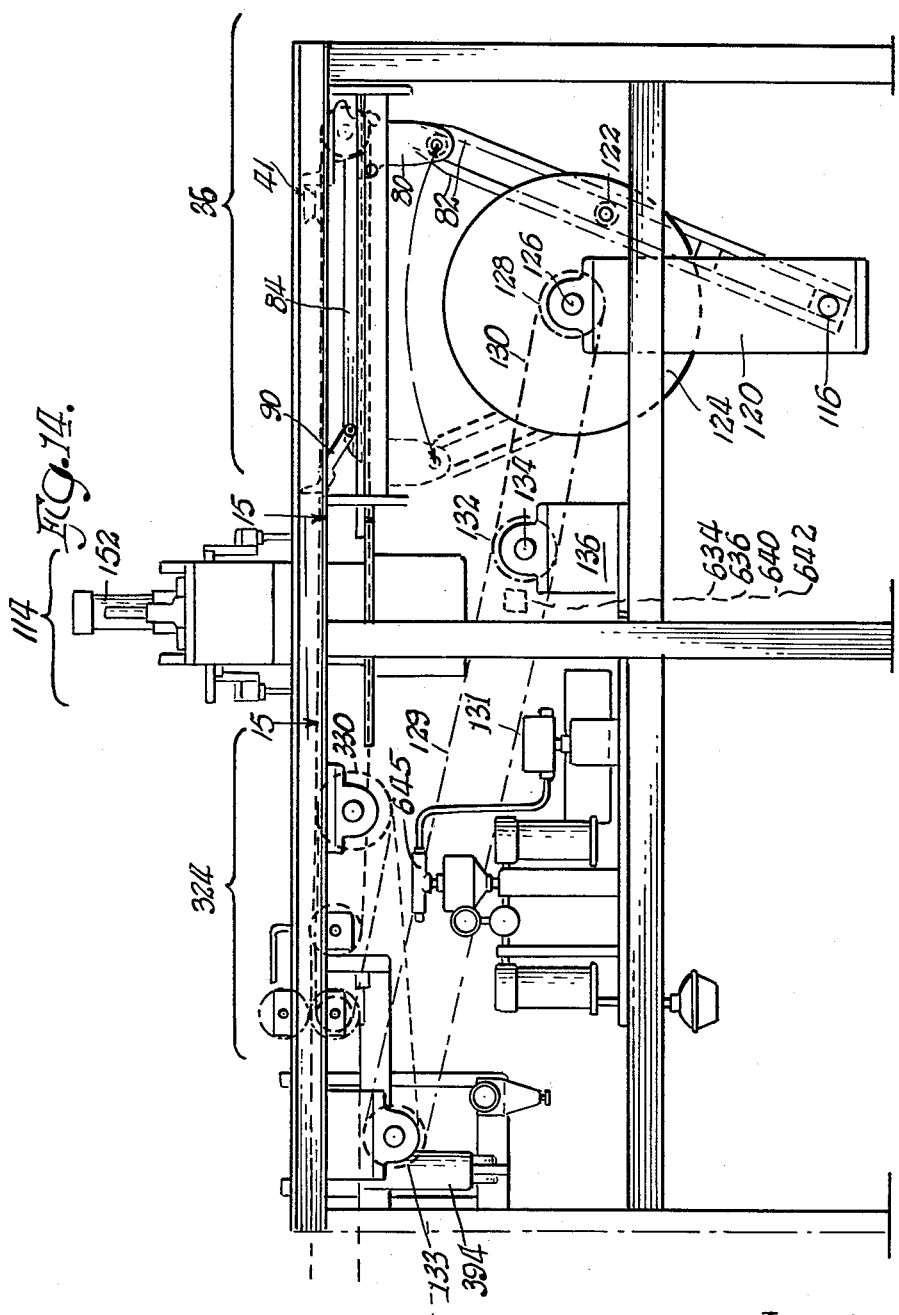

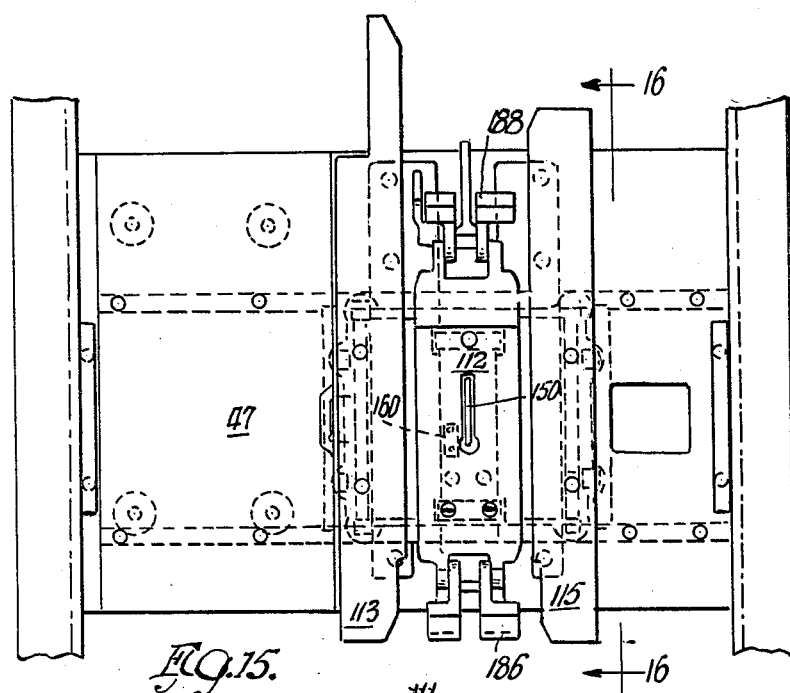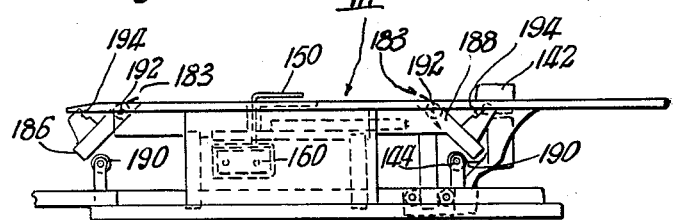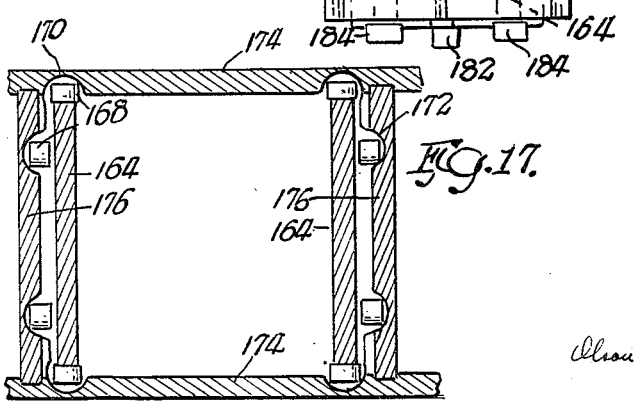

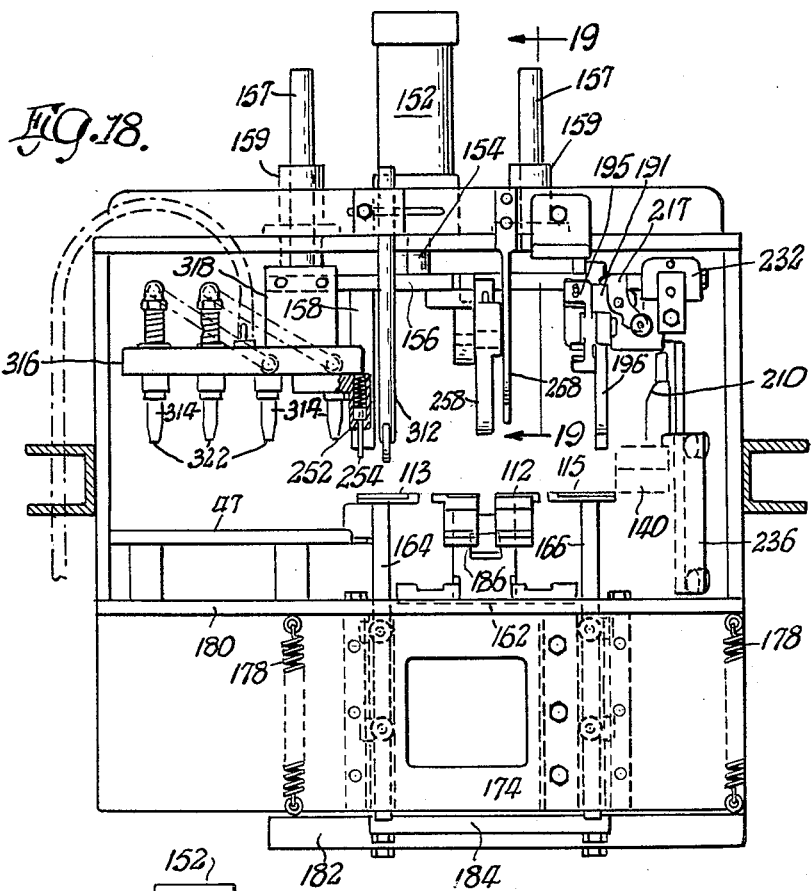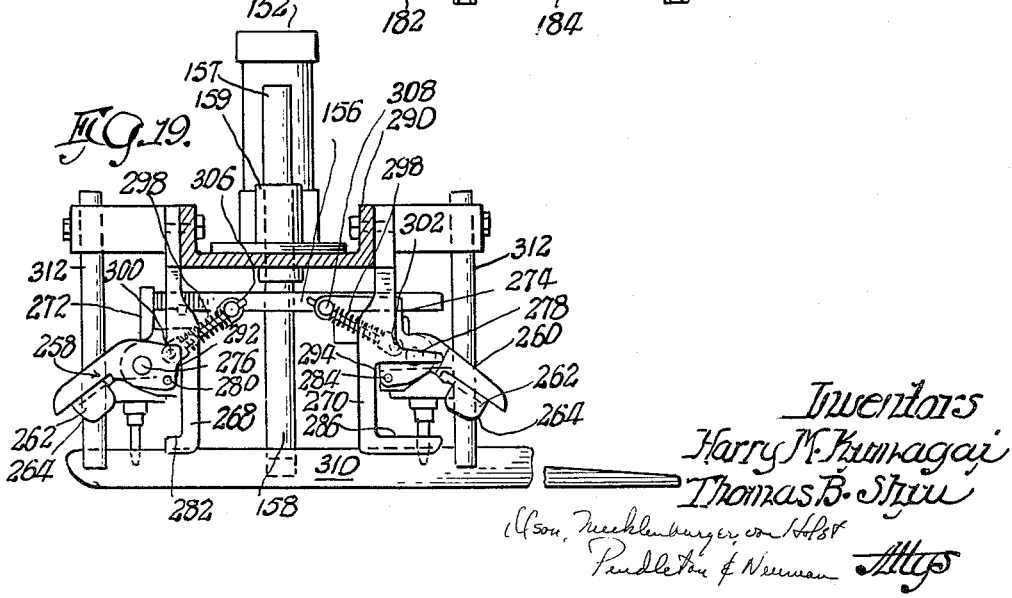

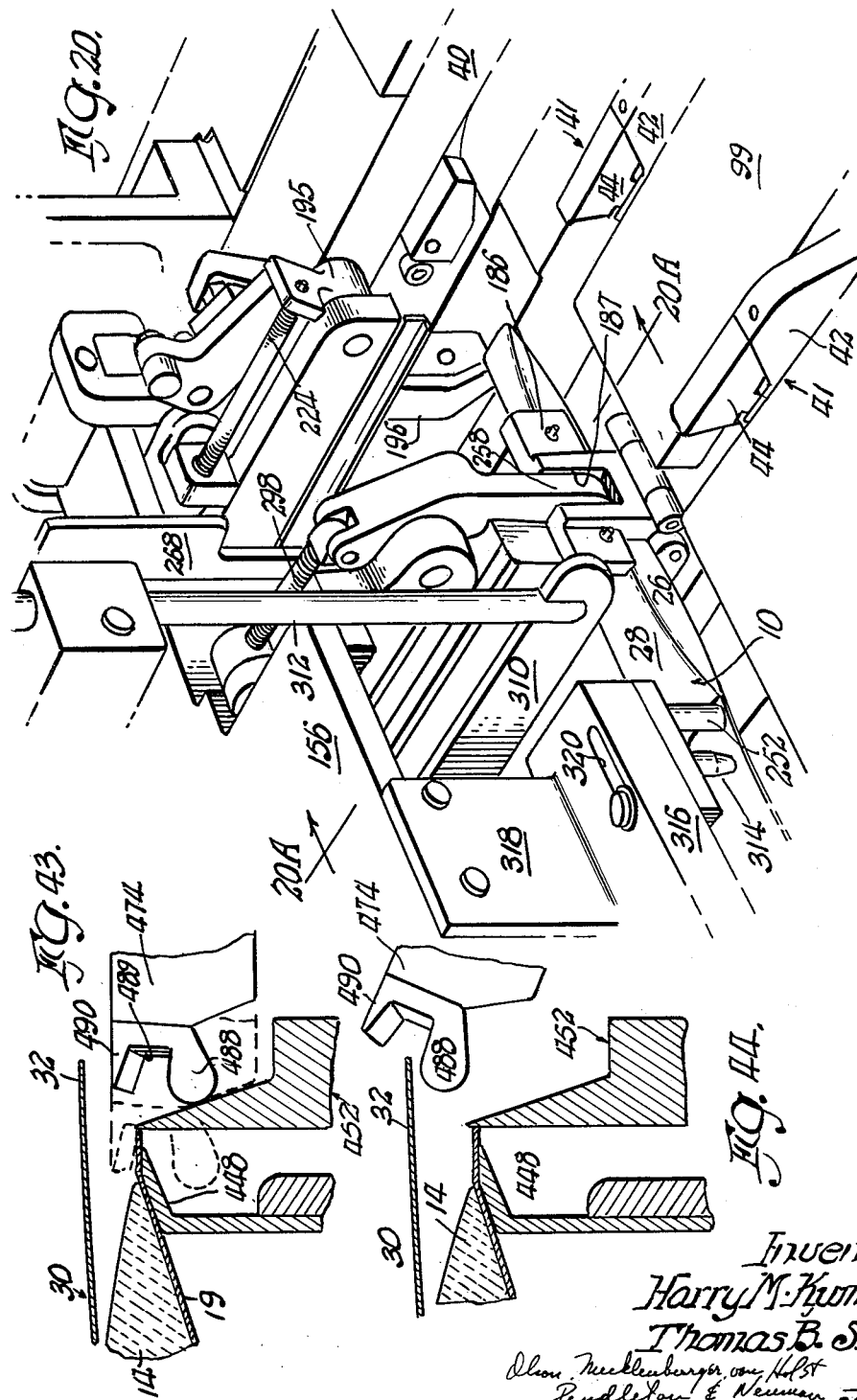

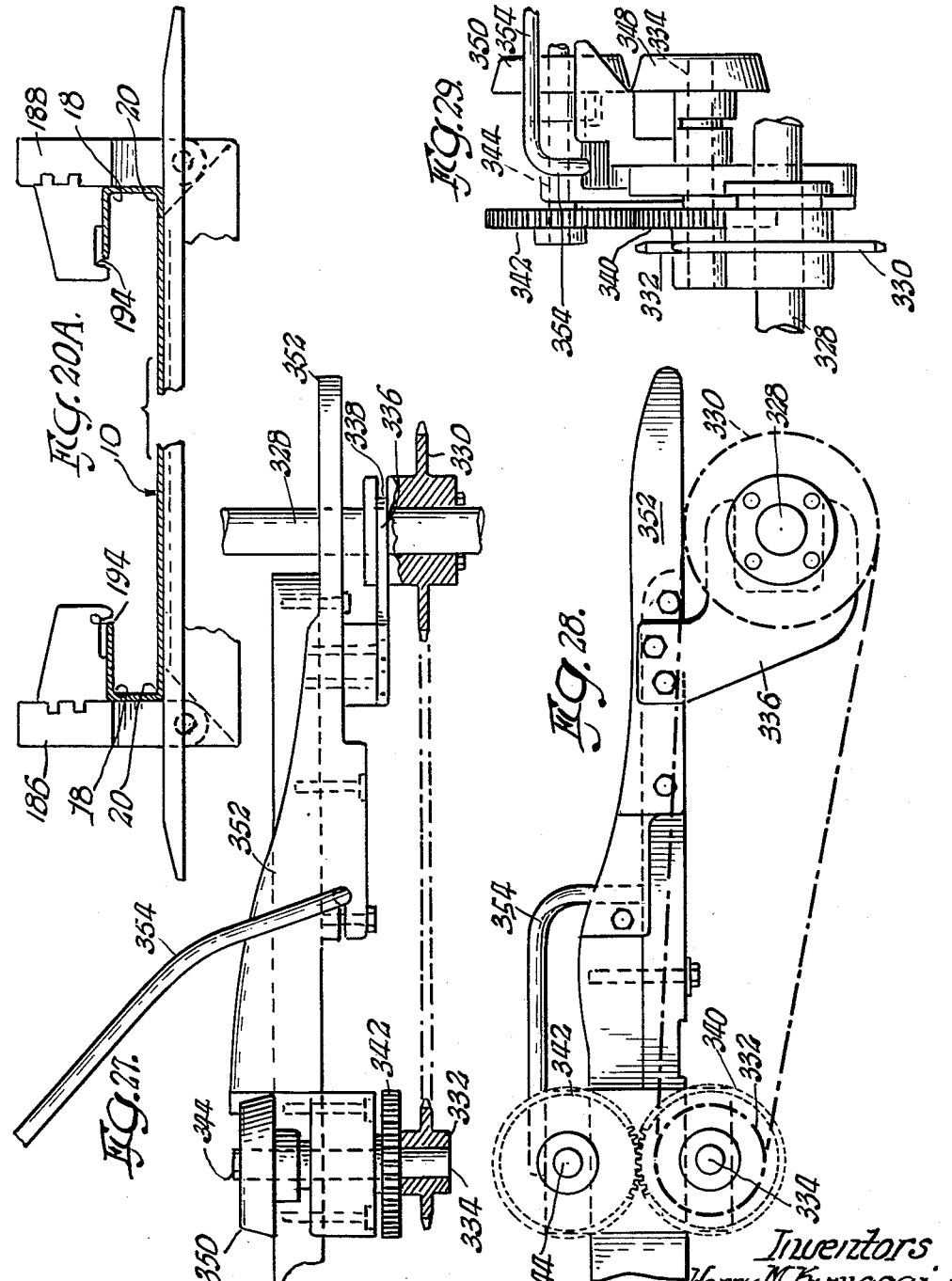

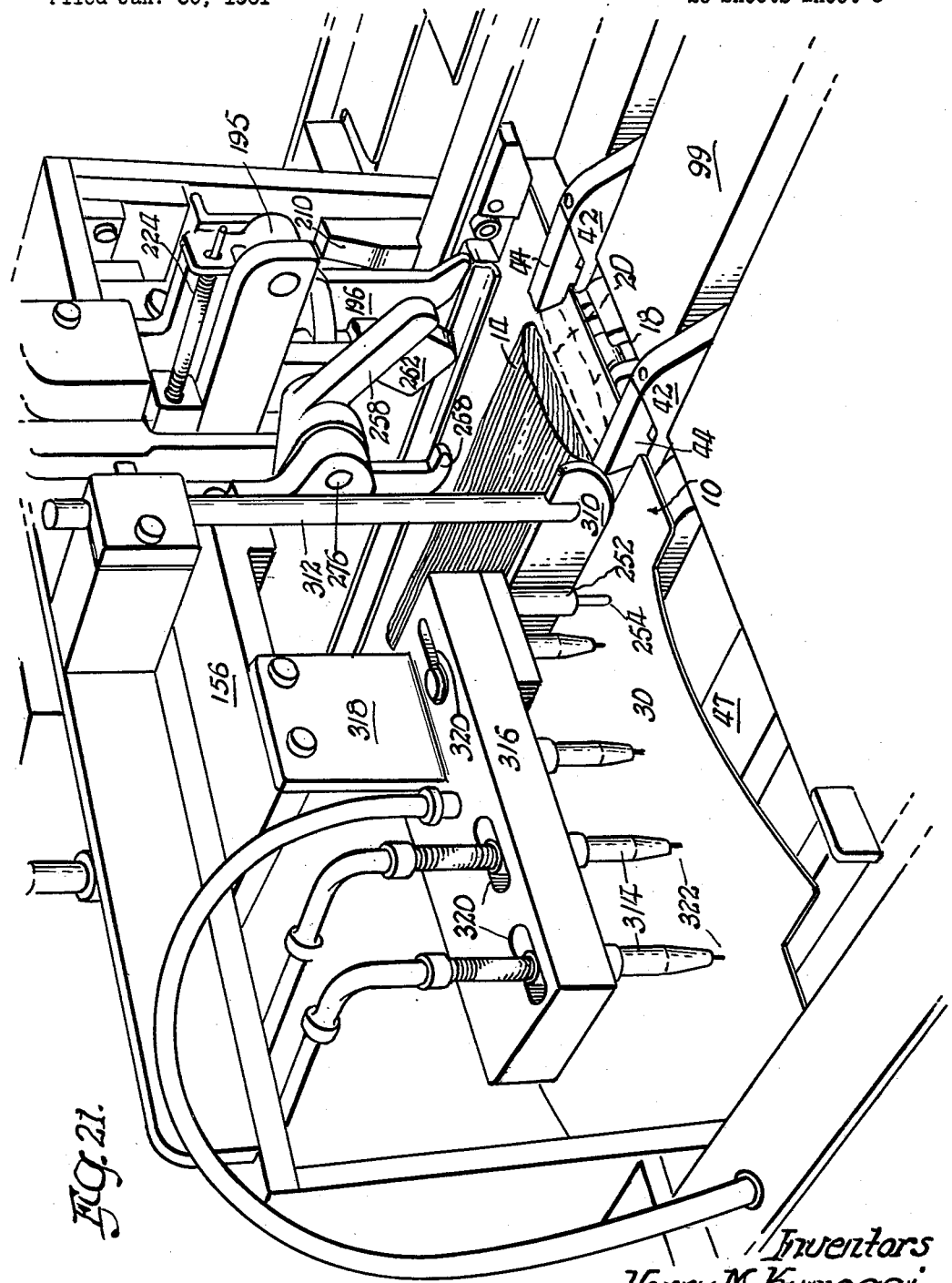

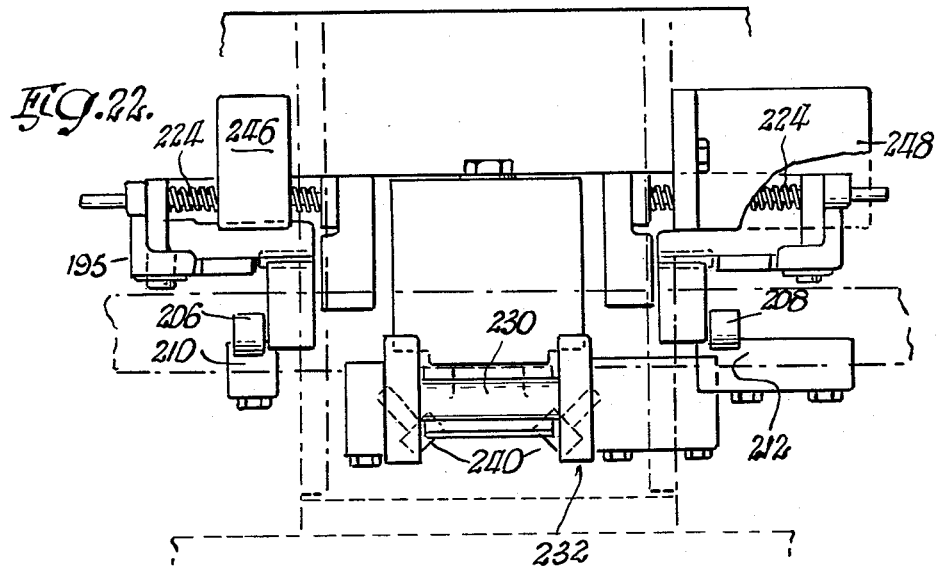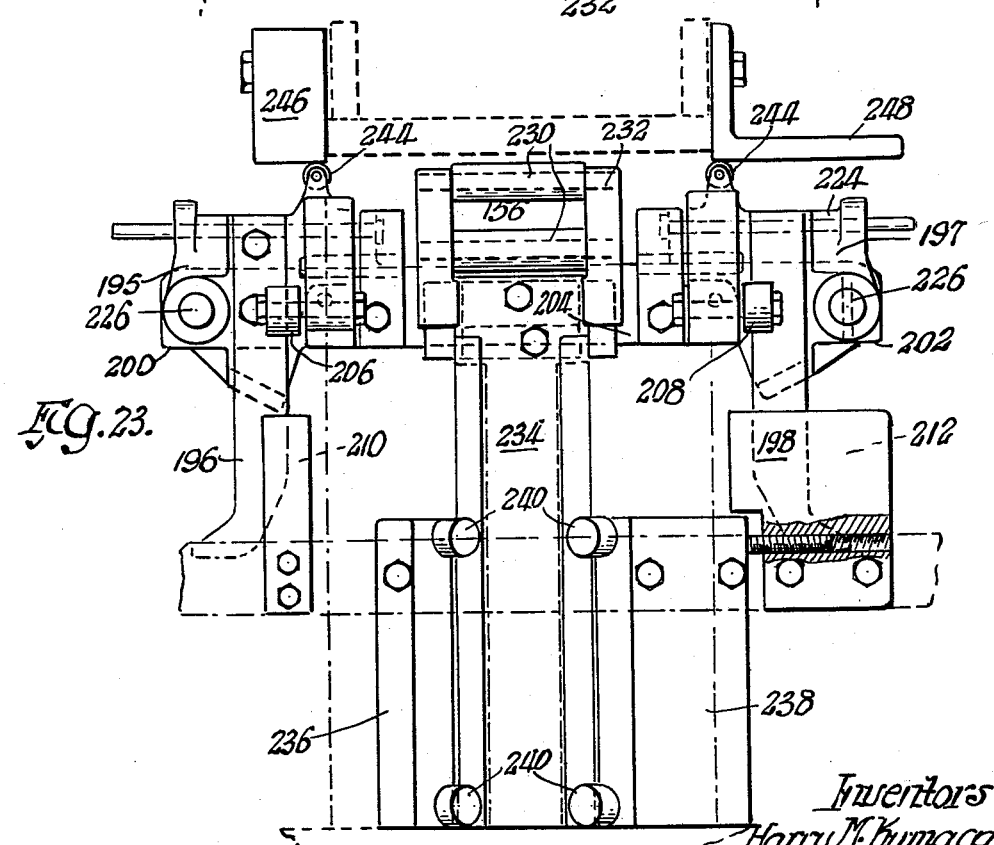

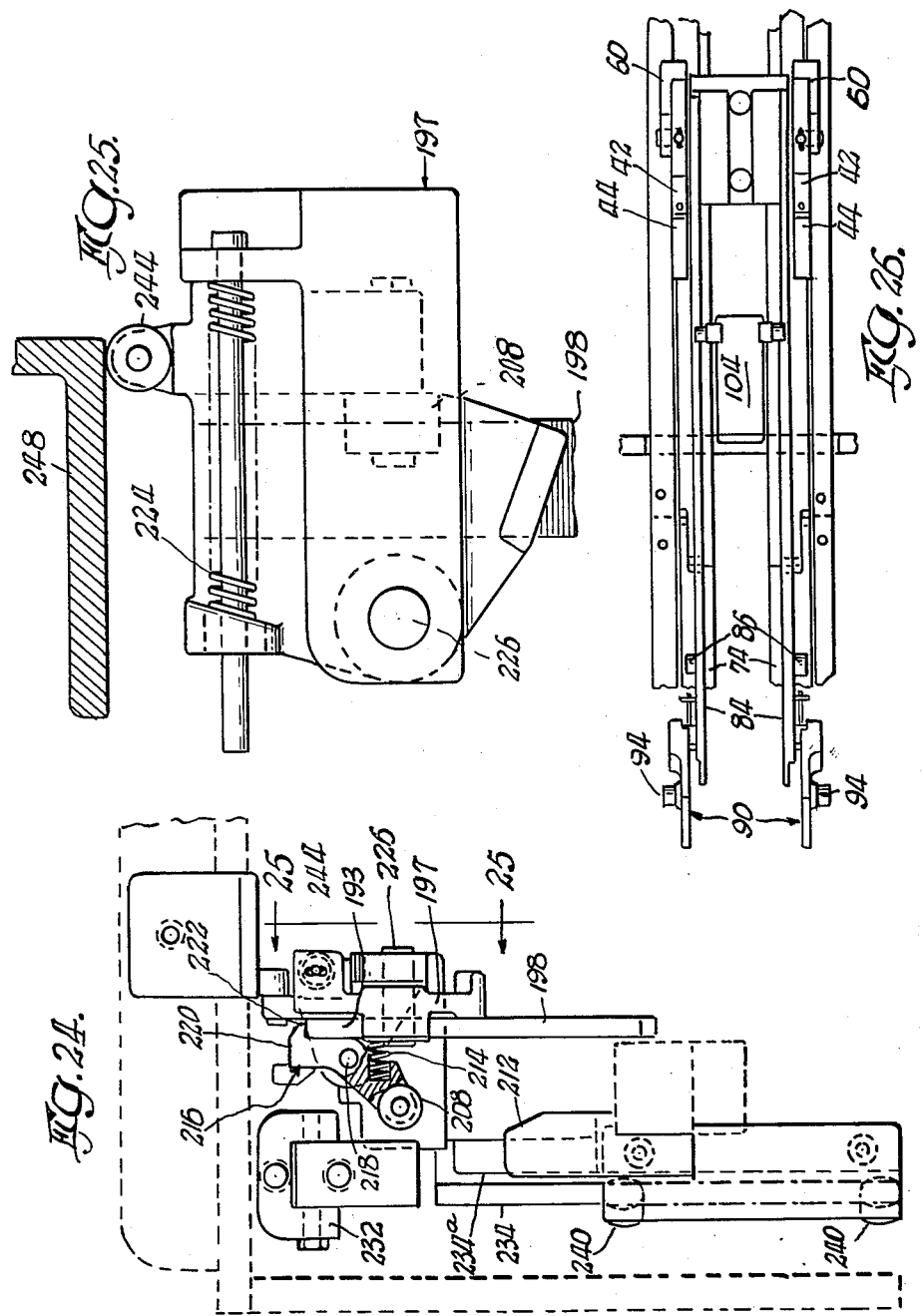

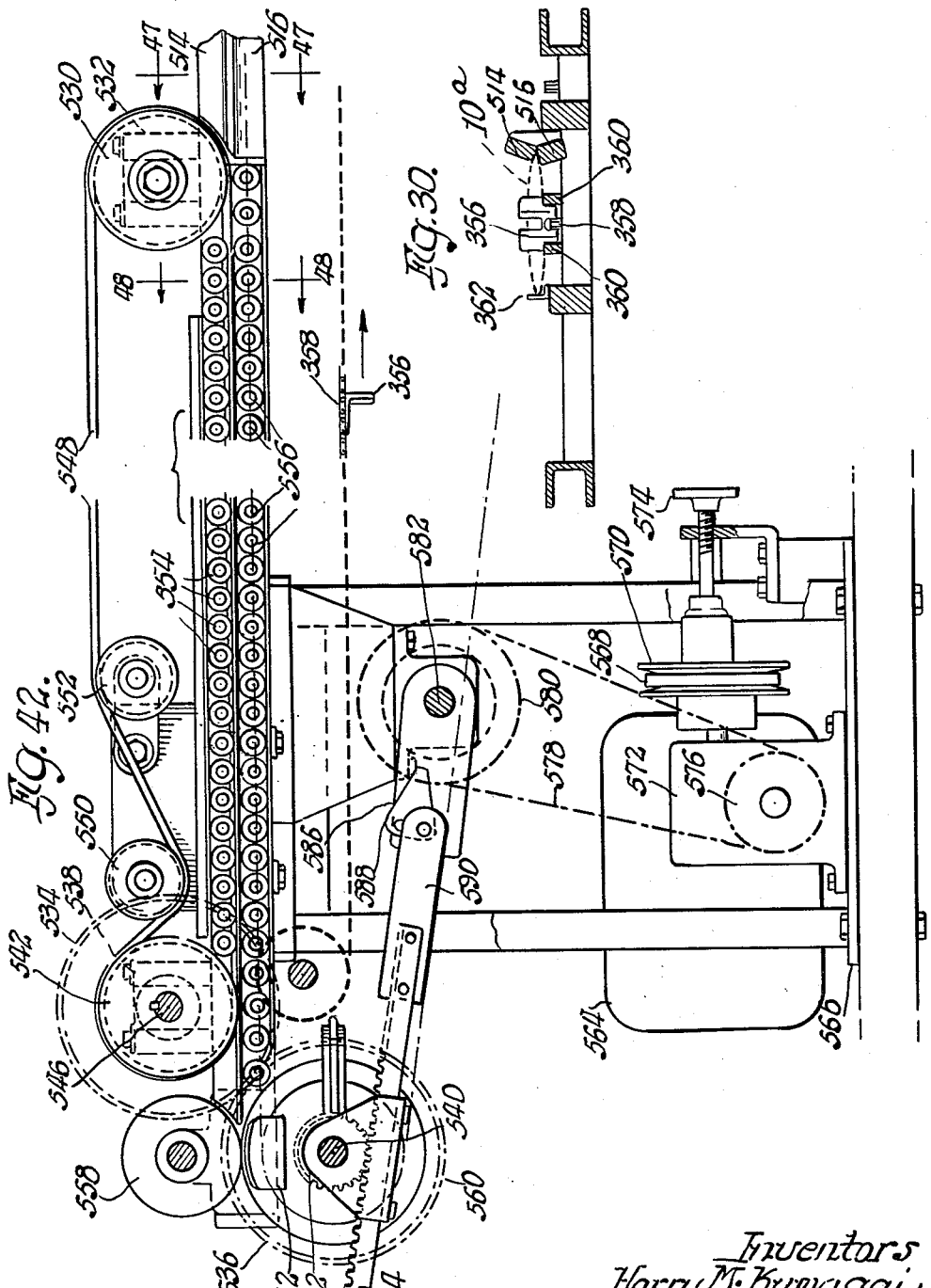

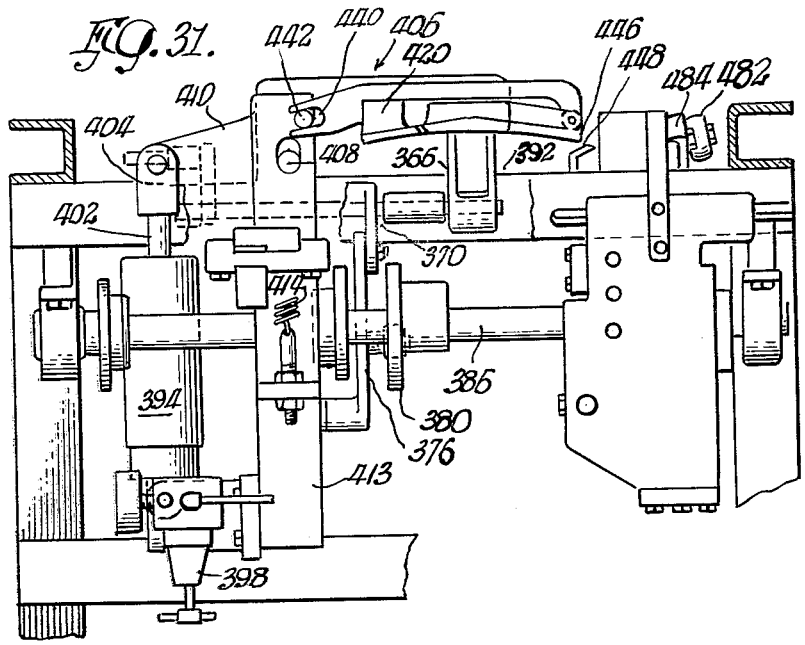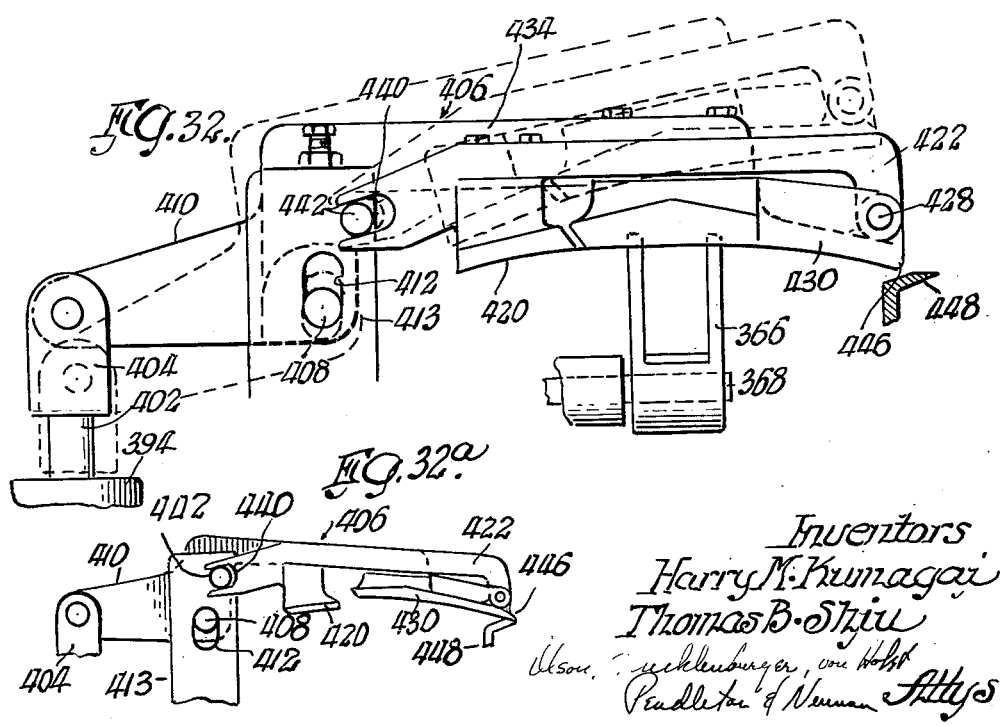

Inventors
Harry M. Kumagai
Thomas B. Shiu
Olson, Mecklenburger, von Holst
Pendleton & Neuman Attys

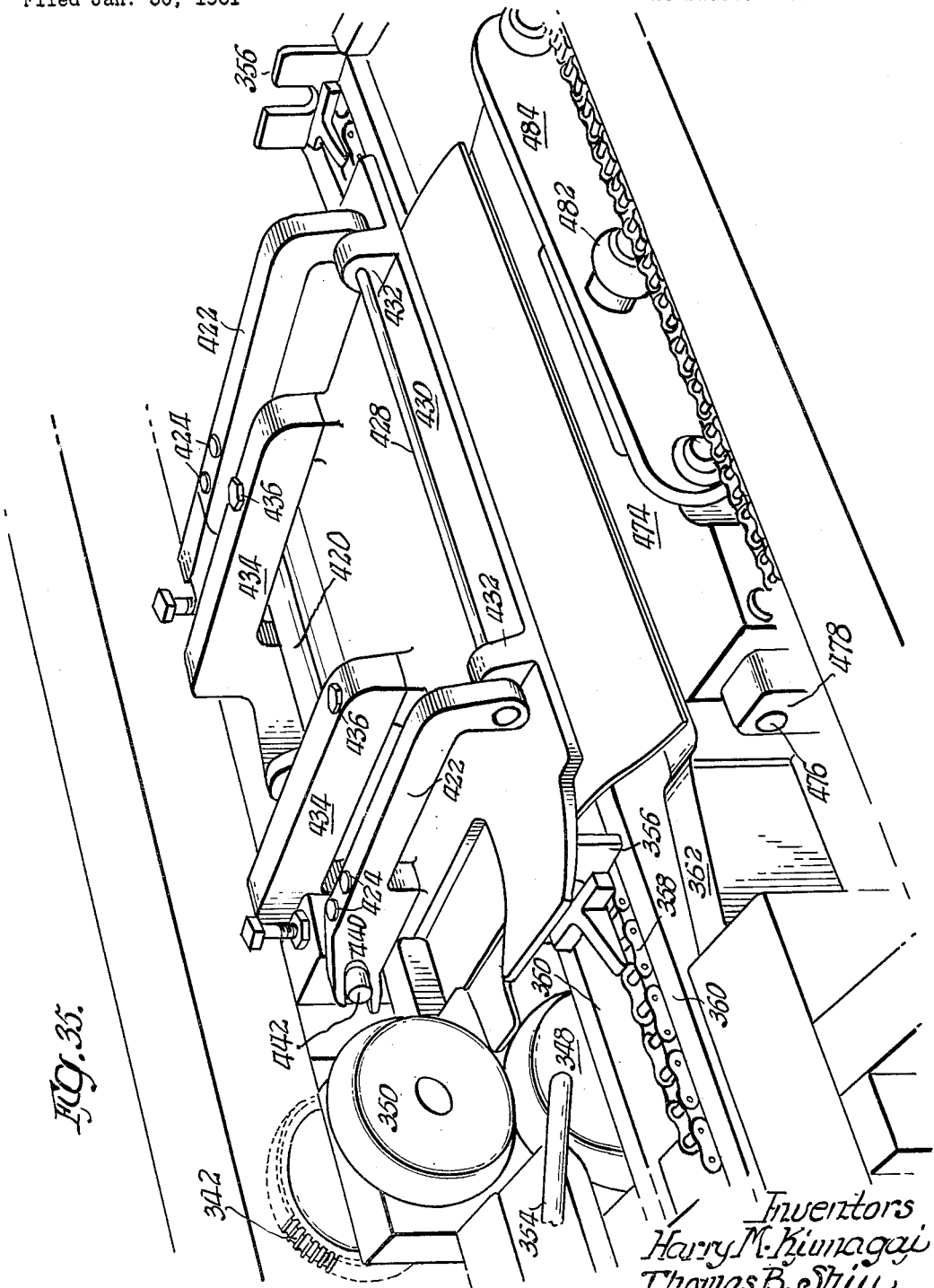

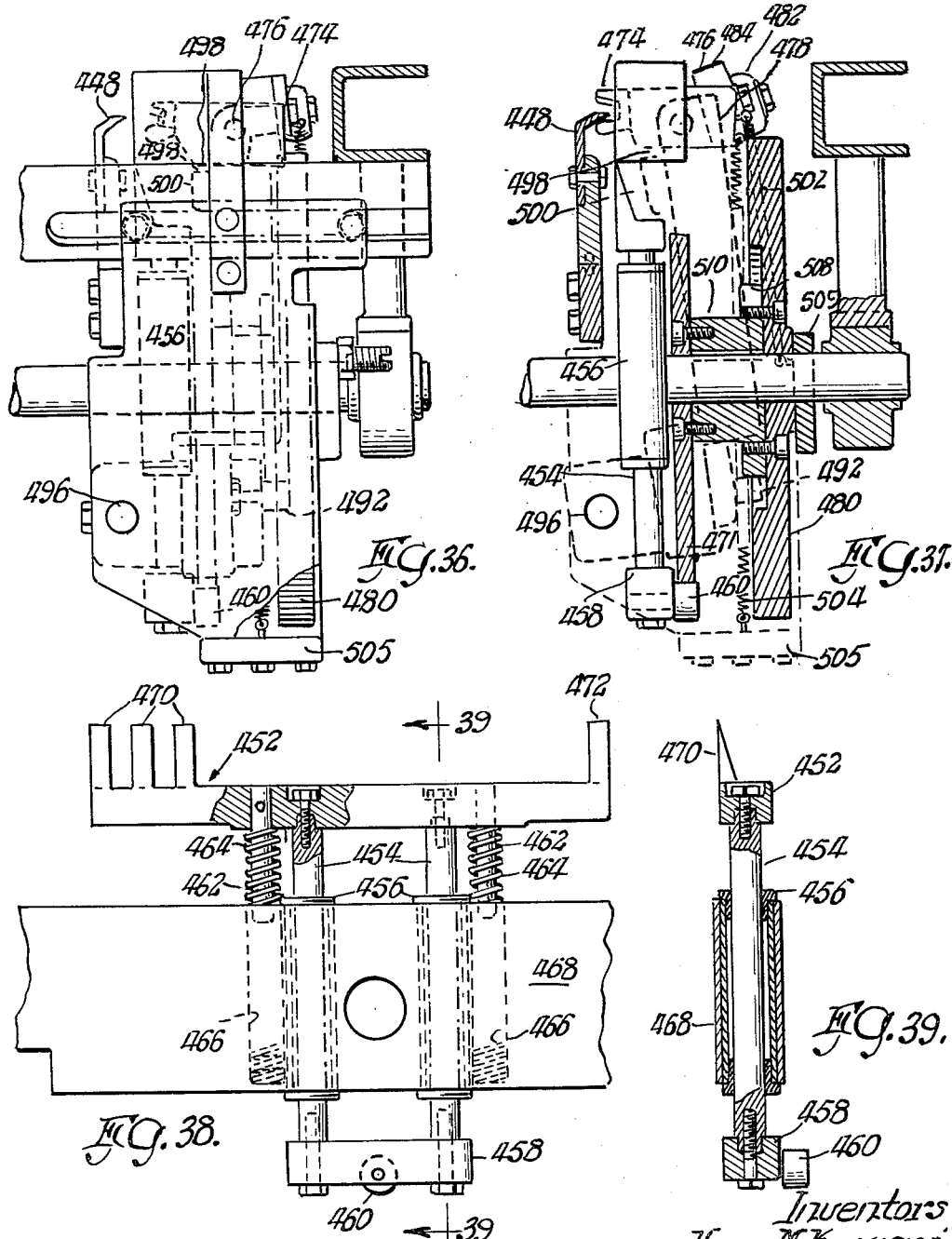

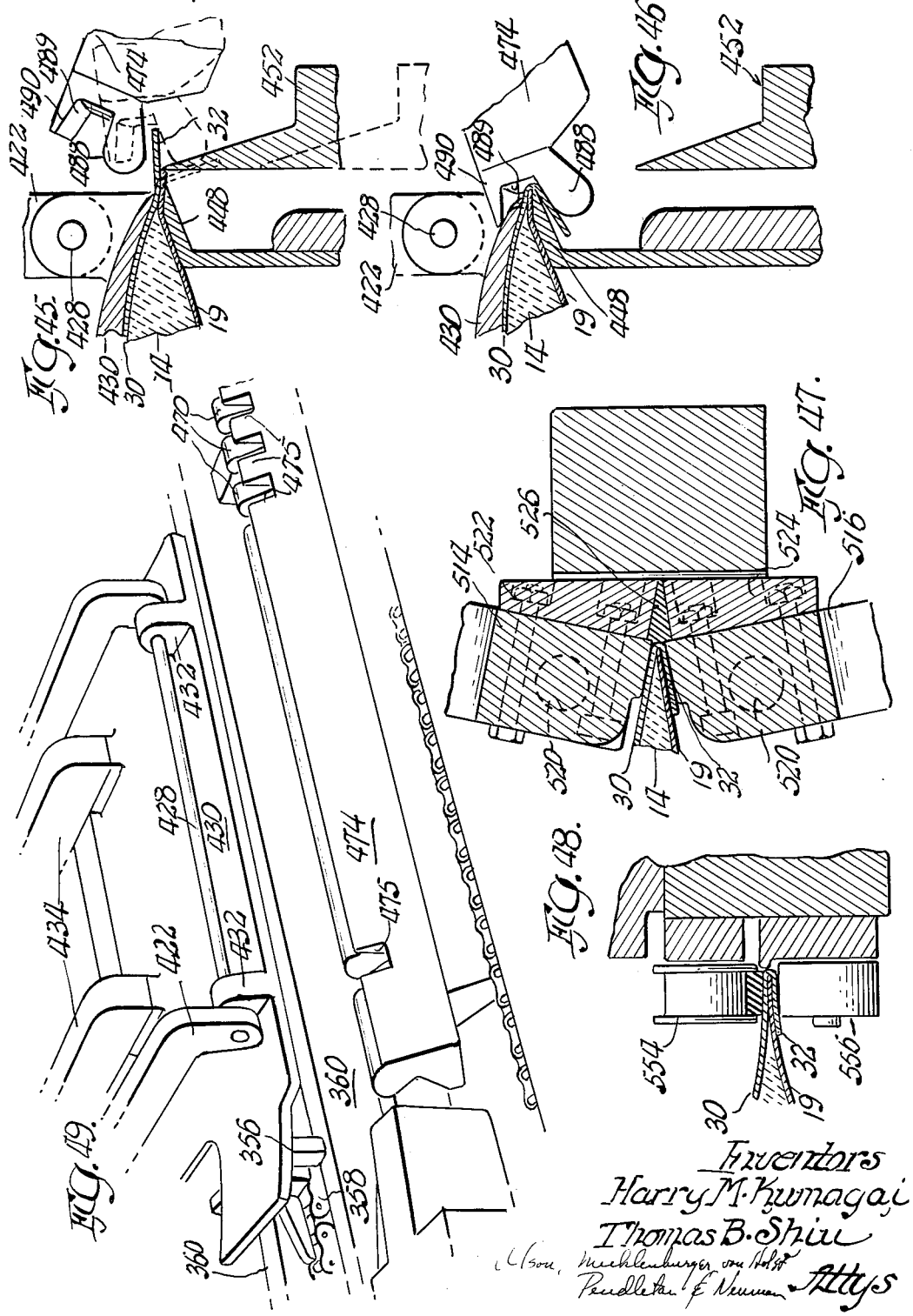

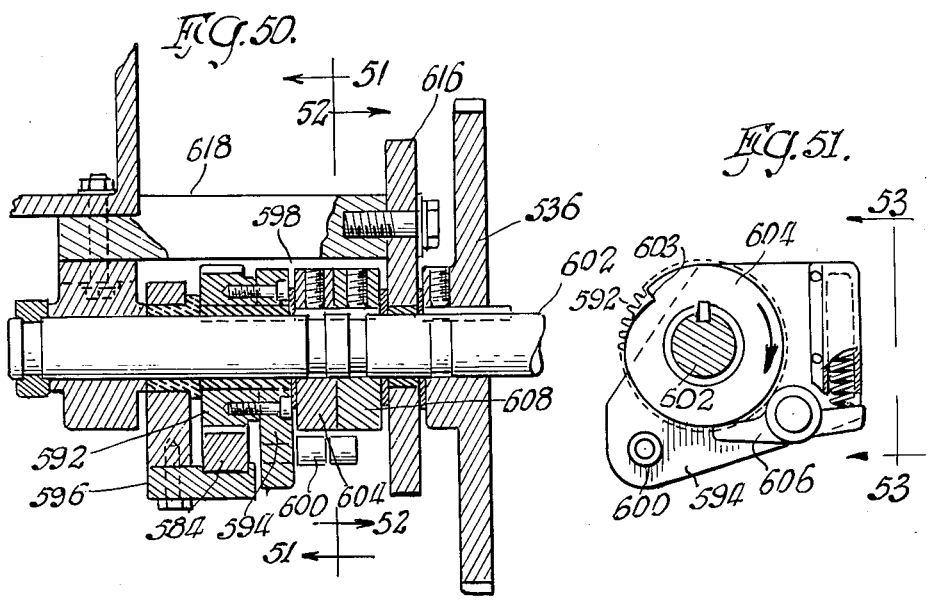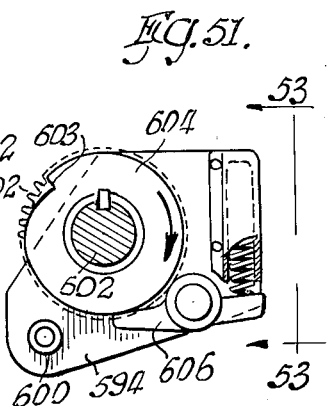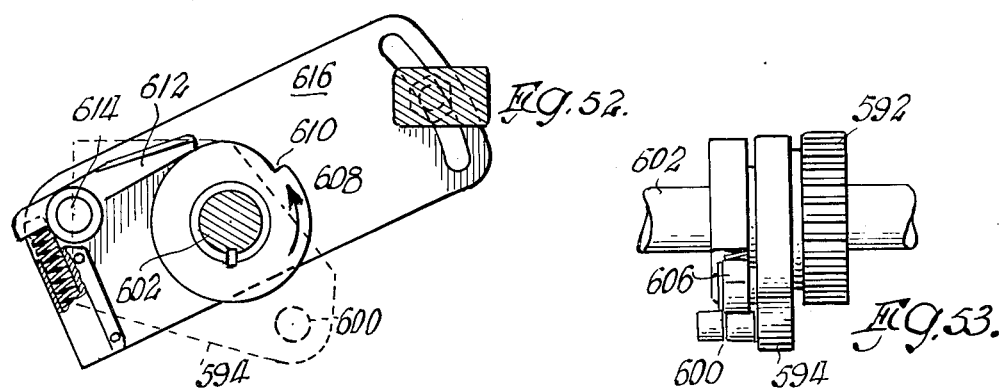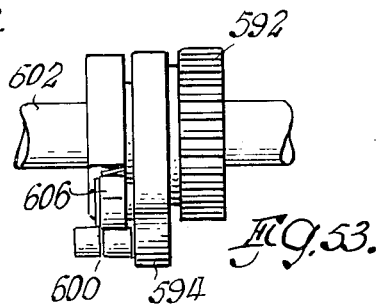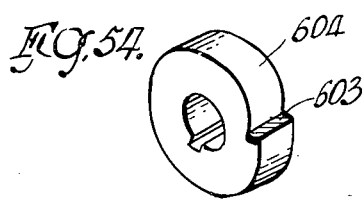

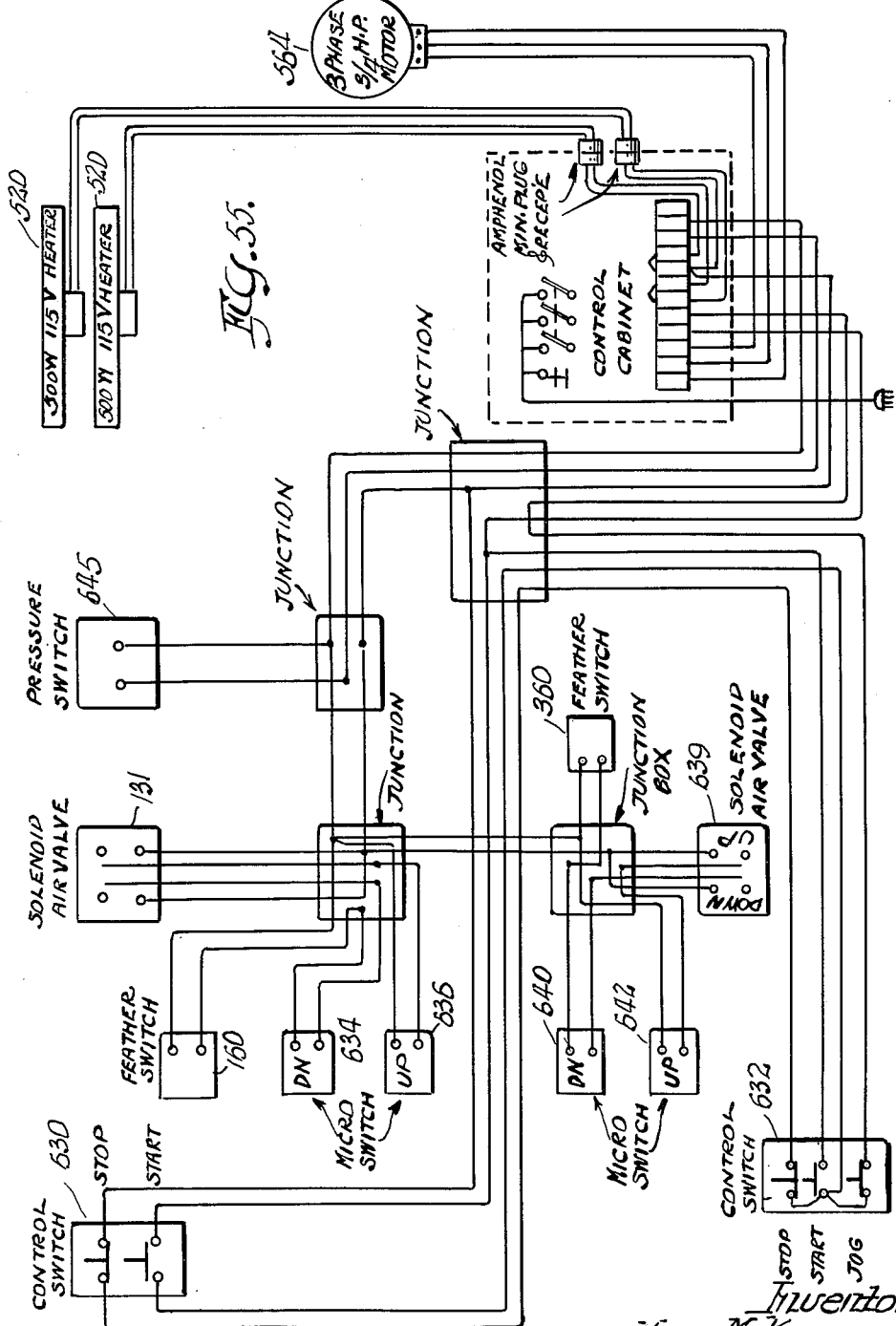

United States Patent Office 3,059,388
Patented Oct. 23, 1962

3,059,388
PACKAGING APPARATUS AND PROCESS
Harry M. Kumagai, Park Forest, and Thomas B. Shiu, Chicago, Ill., assignors to Machinery Development Corporation, Chicago Heights, Ill., a corporation of Illinois
Filed Jan. 30, 1961, Ser. No. 85,791
20 Claims. (Cl. 53—39)

This invention relates to a novel method for folding paperboard blanks into a completed package, and apparatus for practicing the method. More particularly, this invention relates to a method for folding a paperboard blank containing a comestible thereon, such as bacon, into a package therefor, and apparatus for carrying out such method.

Many machines are in operation which will function to form paperboard blanks into final package form. However, packages of unusual design and construction oftentimes necessitate the employment of a number of worker manipulations, in addition to apparatus processing steps. Such manipulations are necessary because of various difficulties encountered in designing apparatus which will completely and automatically form a final package from an initially inserted blank.

Thus, it is an object of this invention, therefore, to provide apparatus and a method for using the same in which a paperboard blank having a comestible disposed thereon is quickly and efficiently formed into a final package in the absence of worker manipulation following initial insertion of such blank into said apparatus.

It is another object of this invention to provide apparatus for forming a paperboard blank on which the comestible disposed on the processed blank is automatically arranged in proper disposition within the completed package.

It is a further object of this invention to provide novel apparatus for concomitantly forming end panels and end panel flaps in desired relative disposition with respect to the bottom panel; said end panels and end panel flaps being connected to the periphery of said bottom panel.

It is another object of this invention to provide novel lid-folding apparatus which imparts an ironing motion on the lid portion of the package and thereby eliminates the formation of bubbles between the lid and underlying end panel flaps.

It is still another object of this invention to provide a novel tucking bar and associated mechanism which efficiently coact to bend and tuck a package cover flap under a package bottom panel.

The above and other objects of this invention will become more apparent from an examination of the following description when read in the light of the accompanying drawings and appended claims.

In accordance with one embodiment of this invention, an apparatus is provided for automatically packaging a quantity of bacon, ham or similar comestible. The bacon to be packaged is disposed on the bottom panel of a paperboard blank which in addition includes portions integrally connected to the periphery of the bottom panel that are folded so as to form opposed end panels and flaps, and a top cover or lid and lid flap.

The blank with the bacon batch thereon is placed in a feeding station where reciprocally movable feed fingers engage side edge portions of the blank and axially move the same into a predetermined position within an end fold station. Upon arrival at the latter station, a switch is actuated by the blank which enables motive means adjacent the station to the energized. The motive means actuates fingers which fold upwardly opposed blank portions thereby forming opposed end panels and flaps. The end panels formed are vertically disposed and the flaps are inwardly folded at substantially right angles to the end panels. In the course of folding opposed end portions of the blank inwardly, the bacon disposed on the bottom panel is properly centered thereon whereby the remaining package formation steps will be facilitated. Also, in the course of folding, adhesive is dispensed on the undersurface of opposed edge portions of the top lid or cover.

Following processing at the end-fold station, the paperboard blank and bacon are moved by pusher fingers from the latter station to a lid-fold station. This latter movement is timed so as not to interfere with apparaus moion within end-fold station. In the process of axially moving to the lid-fold station, a plow member, interposed the aforementioned stations, engages the paperboard blank top lid and forces the same into overlying relation with the opposed end flaps and the bacon batch disposed on bottom panel of the blank. Portions of the blank defining the hinge between the bottom panel and overlying lid then pass between mash rolls which urge the engaged blank portions together facilitating the subsequent lid-folding operation.

Upon the partially folded blank arriving at the lid-fold station a switch is actuated causing energization of a pivotally mounted multi-piece lid-fold mechanism which forces the blank top lid into adhesive engagement with the underlying end flaps. In the course of the movement of the lid-fold mechanism, an "ironing" action draws the blank lid over the underlying end panels to eliminate any wrinkles, as will hereinafter be further explained.

Following the lid-fold operation, a cam-actuated tuck bar, oppositely disposed and parallel to the lid flap, bends the flap relative to the integrally connected blank lid and tucks the same beneath the blank bottom panel. The surface of the lid flap urged against the bottom cover undersurface has a heat activatable adhesive disposed thereon at predetermined intervals.

The formed package is then axially moved from the lid-fold station following the flap-tucking operation and passed through heating and cooling stations by a conveyor mechanism. In passing through heating and cooling stations, the adhesive disposed on the cover flap is activated and the lid flap tightly urged against the undersurface of the bottom panel of the package.

For a more complete understanding of this invention, reference will now be made to the drawings wherein:

FIGURE 1 is a top plan view of a paperboard blank in the form it possesses at the feeding station of the improved apparatus, the available rectangular packing area of the bottom panel of the blank being defined by dotted lines;

FIG. 2 is a top plan view of a paperboard blank in the form it assumes at the cooling station of the improved apparatus;

FIG. 3 is a fragmentary perspective view of the paperboard blank with the comestible disposed thereon and showing the blank in the form it assumes at the end-fold station of the improved apparatus;

FIG. 4 is an enlarged sectional view taken along line 4—4 of FIG. 3 but showing the lid in closed position and the lid flap shown disengaged from the undersurface of the bottom panel;

FIG. 5 is an enlarged fragmentary sectional view taken along line 5—5 of FIG. 3 but showing the lid in a closed position;

Figure 33:
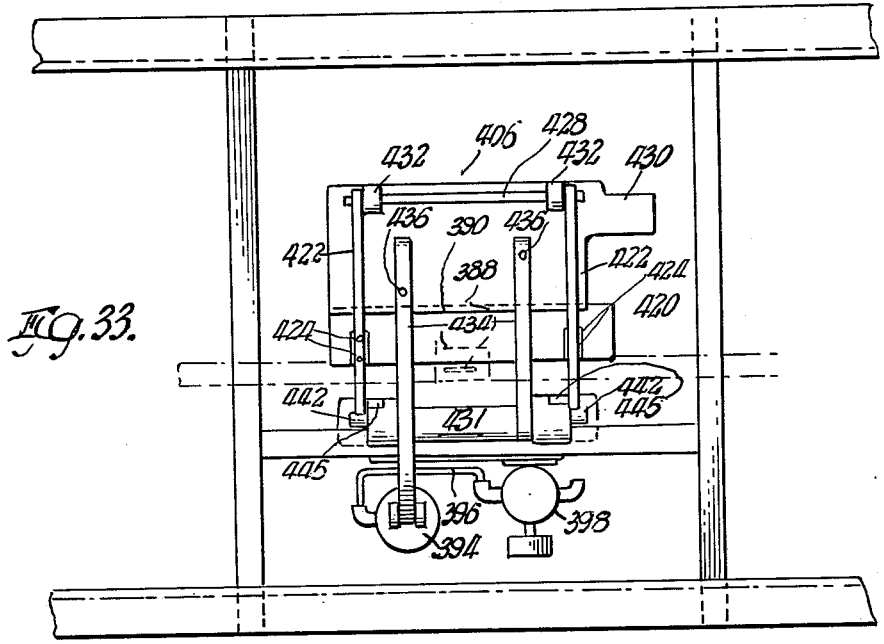
Figure 34:
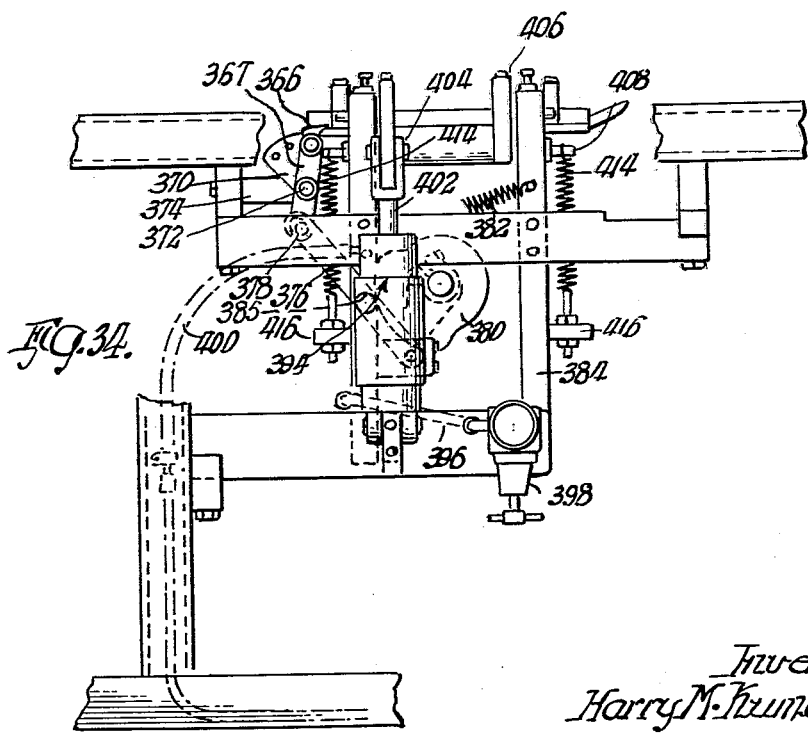
Figure 40:
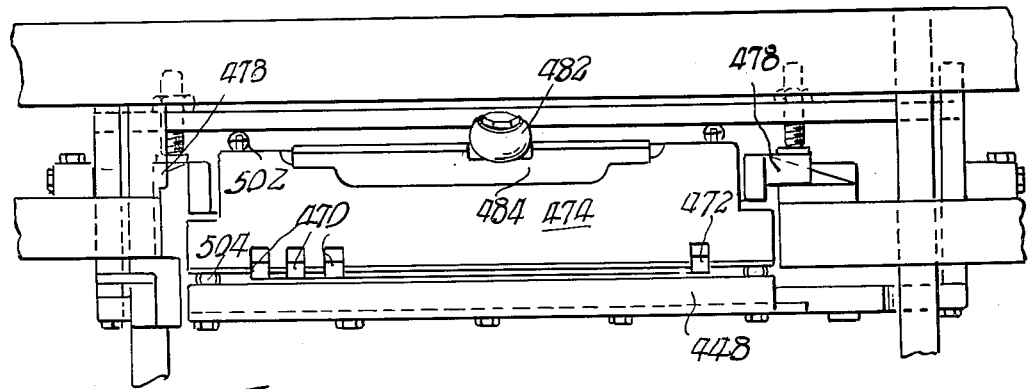
Figure 41:
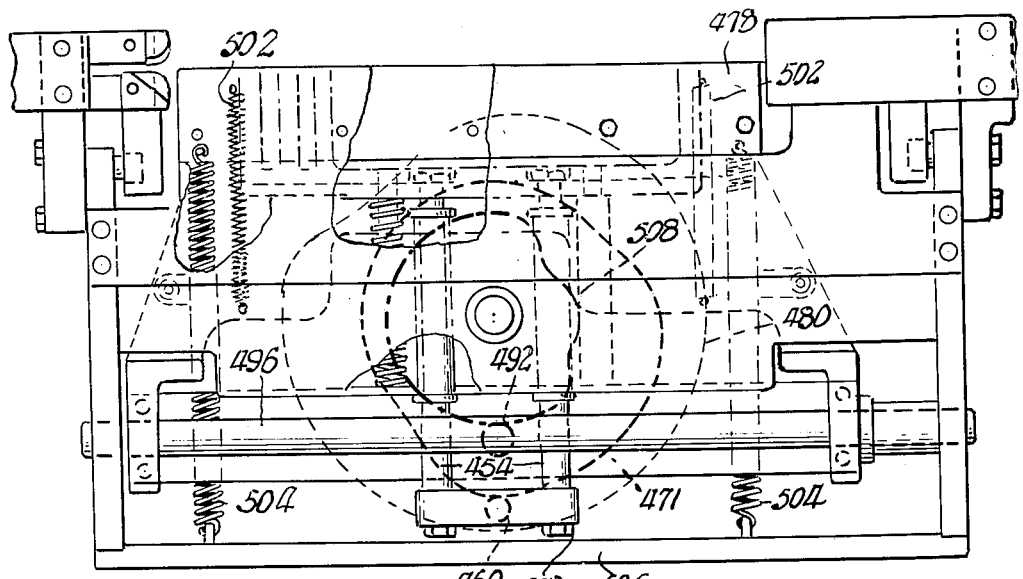

FIG. 6 and 7 taken together show a top plan view of the entire improved apparatus of this invention;

FIG. 8 is an enlarged sectional view taken along line 8—8 of FIG. 7;

FIG. 9 is an enlarged exploded view of two components of the feed finger assembly shown in FIG. 8;

FIG. 10 is an enlarged sectional view taken along line 10—10 of FIG. 11;

FIG. 11 is a fragmentary left side elevational view of the pusher and feed finger assembly shown in FIG. 8 and utilized at the feeding station of the improved apparatus;

FIG. 12 is a fragmentary elevational view taken along line 12—12 of FIG. 11;

FIG. 13 is an enlarged sectional view taken along line 13—13 of FIG. 11;

FIG. 14 is an enlarged fragmentary bottom view of FIG. 7;

FIG. 15 is an enlarged fragmentary sectional view taken along line 15—15 of FIG. 14;

FIG. 16 is a fragmentary sectional view taken along line 16—16 of FIG. 15;

FIG. 17 is an enlarged fragmentary sectional view taken along line 17—17 of FIG. 16;

FIG. 18 is an enlarged fragmentary sectional view taken along line 18—18 of FIG. 17;

FIG. 19 is a sectional view partly in elevation taken along line 19—19 of FIG. 18;

FIG. 20 is a fragmentary enlarged perspective end view of the end fold station shown in FIG. 18; the end of said section being that adjacent the feeding station of the improved apparatus and the end fold fingers being shown in the blank-engaging position;

FIG. 20a is a fragmentary sectional view taken along line 20a—20a of FIG. 20;

FIG. 21 is a fragmentary enlarged perspective view similar to FIG. 20 but showing the end fold fingers in their retracted inoperative position;

FIG. 22 is a top plan view of the end hold-down assemblies employed in the end fold station shown in FIGS. 20 and 21;

FIG. 23 is a bottom view of FIG. 22;

FIG. 24 is a right side elevational view of FIG. 23;

FIG. 25 is an enlarged fragmentary side elevational view taken along line 25—25 of FIG. 24;

FIG. 26 is a fragmentary top plan view of FIG. 11 and illustrated on a reduced scale;

FIG. 27 is a fragmentary top plan view of the mash roll and plow station of the provided apparatus shown in FIG. 7;

FIG. 28 is a bottom view of FIG. 27;

FIG. 29 is a right end view of FIG. 28;

FIG. 30 is a vertical fragmentary sectional view of the heating station of the improved apparatus;

FIG. 31 is an enlarged fragmentary sectional view of the lid-fold and tuck fold stations taken along line 31—31 of FIG. 7;

FIG. 32 is an enlarged fragmentary side elevational view of the lid-fold plate assembly and stop finger of the lid-fold station shown in FIG. 31; the lid-fold plate assembly being shown in dotted lines in a blank receiving position for the station;

FIG. 32a is similar to FIG. 32 on a reduced scale and showing the position of the lid-fold plate assembly following impact with the anvil;

FIG. 33 is a top plan view of FIG. 31;

FIG. 34 is a bottom view partly broken away of FIG. 33;

FIG. 35 is an enlarged perspective view of the mash rolls and upper portion of the lid-fold and tuck fold stations shown in FIG. 7;

FIG. 36 is a fragmentary front view of the right hand side of FIG. 31 with the cover plate removed;

FIG. 37 is similar to FIG. 36 with the tuck fold arm shown in a changed position;

FIG. 38 is a left side elevational view of FIG. 37 partly broken away so as to show the edge hold guide bar assembly;

FIG. 39 is a sectional view taken along line 39—39 of FIG. 38;

FIG. 40 is a fragmentary top plan view of FIG. 36;

FIG. 41 is a bottom view of FIG. 40 partly broken away;

FIG. 42 is an enlarged fragmentary elevational view partly in section taken along line 42—42 of FIG. 6;

FIGS. 43 through 46 are enlarged fragmentary sectional views of the tuck fold bar in sequential positions of tuck fold operation;

FIG. 47 is an enlarged sectional view taken on line 47—47 of FIG. 42 with a package fragment shown in place;

FIG. 48 is an enlarged sectional view taken on line 48—48 of FIG. 42 with a package fragment shown in place;

FIG. 49 is a fragmentary perspective view similar to FIG. 35 but showing tuck fold bar thereof in a raised position;

FIG. 50 is a fragmentary sectional view of elements of the main drive assembly in the improved apparatus;

FIG. 51 is a sectional view taken on line 51—51 of FIG. 50;

FIG. 52 is a sectional view taken on line 52—52 of FIG. 50;

FIG. 53 is an elevational view taken along line 53—53 of FIG. 51;

FIG. 54 is a perspective view of a single tooth ratchet gear shown in FIGS. 50 and 51; and FIG. 55 is a wiring diagram of the electrical components of the improved apparatus.

PAPER BLANK PROCESSED BY APPARATUS

Referring now to FIG. 1, paperboard blank 10 is illustrated which is to be processed by the apparatus hereinafter described. The blank 10 is processed into a final package 12, illustrated in FIG. 2, and is particularly adapted to hold a comestible such as a sliced bacon batch 14 illustrated in FIG. 3. The rectangular periphery 16 of FIG. 1 encloses a normal packing area 17 of bottom panel 19 in which the bacon is disposed prior to blank processing.

Blank 10 has formed therein two arcuate fold lines 18 outwardly bowed relative to one another and two arcuate fold lines 20 inwardly bowed relative to one another in addition to straight fold lines 22 and 24. In the course of processing, blank 10 is folded along these lines thereby forming end panels 26, end panel flaps 28 and cover or lid 30, as seen in FIG. 3, in addition to lid flap 32 seen in FIG. 1. Heat activatable adhesive 34 is disposed on the blank corners and intermittently along the lid flap for retention of folded portions of the blank in desired relative disposition in the course of package formation.

Because of arcuate fold lines 18 and 20, the final package 12 has a unique, curved-bounded lateral cross section, as noted in FIG. 4, and has a central longitudinal cross section of rectangular peripheral configuration as noted in FIG. 5. The unique lateral cross section of the package conforms substantially with the normal lateral cross-sectional configuration of bacon batch 14 placed on the blank prior to package formation. The final package is thus compact with substantially no relative movement permissible between the package and contents.

FEED STATION

The paper blank 10 is placed in feed station 36 of apparatus 38, more clearly seen in FIGS. 7 and 14, after a weighed batch of bacon has been placed on the packing area of the blank bottom panel 19. The apparatus 38, to be hereinafter more fully described, is adapted to automatically fold the blank 10 about the bacon batch 14 as the blank is caused to pass through various stations provided on the apparatus. The free elongate edge of panel bottom 19 is positioned against a laterally adjustable guide bar 40, forming a part of apparatus 38 (see FIG. 20), with the blank lid 30 extending away from bar 40 transversely to the direction of the movement of the blank through the apparatus. Guide bar 40 is laterally adjustable to insure proper disposition of each blank as determined by the width of the blank bottom panel prior to engagement thereof with feed finger assemblies 41. It is apparent that the particular dimensions of a paperboard blank will vary in accordance with the volume of contents contained therein. The provided apparatus is adapted to handle blanks of varying size and slight adjustments, such as that of guide bar position, are readily made when the size of the blank being processed is changed.

FIG. 9 shows an enlarged exploded view of one of the feed finger assemblies 41 wherein the latter includes a feed finger base 42 and feed finger insert 44 both of which are retained in assembled relationship by means of insert compression spring 46 and pin 48 (see FIG. 13). The pin 48 is appropriately secured at its upper end to insert 44. Opposed faces 50 and 52 of insert 44 have different angles of inclination and, accordingly, are adapted to engage blanks having bacon batches of different thicknesses disposed thereon. The operative inclined face 50 or 52 of insert 44 may be readily changed merely by lifting the insert and rotating the same 180 degrees and then releasing same. Tongue 54 of insert 44 (see FIG. 9) is received in groove 56 of base 42 and prevents relative movement between the two main finger components 44 and 42 in the normal course of use.

Two feed finger assemblies 41 are employed and the finger base 42 of each is secured to a mounting bar 58 by means of a spring 59, pin 61 and locking disc 63, as illustrated in the sectional view, FIG. 10. Bar 58 is in turn bolted to feed finger pivot block 60, see FIG. 11. Each block 60 and the assembly mounted thereon may pivot about a pin 62, which is disposed centrally on carriage mounting block 68. A torsion spring 64 urges the block in a clockwise direction, as viewed in FIG. 11. The weight of the feeder finger assembly 41 tending to pivot each block 60 in a counterclockwise direction is so counterbalanced by weight 66 that little force is needed to tilt the block and associated parts counterclockwise.

The carriage mounting block 68 employs oppositely disposed undercarriage roller mounting bars 70 (see FIG. 8) having rollers 72 mounted thereon which rotatably engage the undersurface of spaced slide rails 74 and assist in retaining the block to the rails. The mounting blocks are pivotally mounted on yoke 80 which is connected to block 60. Springs 76 are compressed between the mounting bars 70 and protuberances 78 formed on carriage drive yoke 80, whereby the rollers of bars 70 are urged against the undersurfaces of rails 74.

In FIG. 8, it will be noted that spaced parallel pusher arms 84 are secured to opposed portions of mounting block 68. These arms are supported at their forward ends by rollers 86 (see FIG. 11) and at their rear end portions by rollers 88 which engage rails 74. A pusher finger 90 is pivotally mounted on the forward end portion of each pusher arm 84 and is maintained in the elevated position of FIG. 11 by means of a torsion spring 92. FIG. 12 is a front elevational view of a pusher finger 90 illustrating a cam follower 94 extending from one side surface thereof. FIG. 26 is a top plan view of the spaced pusher finger and feed finger assemblies of the provided apparatus.

The yoke, having the two feed finger assemblies 41 mounted thereover, and the pusher bars 84 are reciprocally moved over slide rails 74 by means of pivotally mounted drive bars 82 (see FIGS. 11 and 14), which engage roller 122 mounted on yoke 80. To prevent removal of a pusher arm portion from the rail 74, hold-down arms 100 having roller members 102, mounted on the lower end limits thereof are employed; the rollers 102 engage the upper edge surfaces of the two pusher arms 84 (see FIG. 11).

It is apparent from FIG. 11 that pivotal movement of drive bars 82 moving the yoke 80 and assemblies mounted thereon to the left will impart an upward thrust to the pusher arms tending to remove the same from the slide rails 74. The two hold-down bars 100 are secured at an upper end limit to a transverse connecting bar 104 which is, in turn, mounted on vertical support 106 bolted to the underlying slide rail support 108. FIGS. 20 and 14 illustrate the relative disposition between upper loading platform 99 over which the paper blank and bacon are pushed and the feed finger assemblies.

At the end limit of the drive bar pivotal movement which drives the paper blank and bacon thereon from the apparatus feed station 36, the paper blank will be partly disposed on package support plate 112, more clearly seen in FIG. 15. Plate 112 comprises a portion of the paper blank end fold station 114, the extent of which is most apparent from the top plan view of FIG. 7.

Referring again to FIG. 14, it will be noted that pivotal movement of drive bars 82 about pivot shaft 116 disposed on mounting frame 120 is effected by means of roller 123, which rides between the opposed drive bars 82 as it is rotatably driven on fly wheel 124 about fly wheel shaft 126, the latter having keyed thereto sprocket 128. Sprocket 128 engages drive chain 130 driven by drive sprocket 132 mounted on drive shaft 134, the shaft in turn being supported by pillow block 136, all of which is apparent in FIG. 14. A continuous rotating drive sprocket continuously drives sprocket 132 by connecting drive sprocket 133 seen in FIG. 14.

The proportions of each fly wheel revolution for advancing and retracting the feed and pusher finger assemblies may be controlled by regulating the distance between drive bar pivot shaft 116 and fly wheel shaft 126.

In the course of reciprocal movement of pusher arms 84, only feed finger assembly portions 42 and 44 and portions of pusher fingers 90 are exposed above the upper loading platform 99 beneath which the pusher arms, yoke, and other elements of the feed finger and pusher finger assembly 101 are disposed out of sight (see FIG. 20). As was above mentioned, the feed finger assemblies 41 are counterbalanced on pivot blocks 60.

Accordingly, in the return cycle of reciprocal movement of the feed finger assemblies 41, that is, in the course of the drive bar 82 movement to the right, the speed of the return movement and resulting momentum cause feed finger assembly portions 42 and 44 to pivot substantially below the surface of the loading platform 99. Consequently, the returning feed finger assembly portions do not in any way provide a hazard to the operators or interfere with a paperboard blank which may be disposed forward of the proper position for engagement by the apparatus feed finger assembly portions. At the end limit of the assembly portions 42 and 44 return movement, the latter resume their proper horizontal position in the manner as illustrated in FIG. 14 so that the bottom of the pusher finger base 42 and the forward exposed face of the feed finger insert 44 are in proper position for engaging the end of a paper blank ready for processing.

END FOLD STATION

Following engagement with the feed finger assemblies 41 of the apparatus 38, a paperboard blank and bacon batch disposed thereon comes to rest at an end fold station 114, illustrated in plan view, FIG. 7. At the end fold station, a paperboard blank, such as blank 10 of FIG. 1, has the opposed end portions thereof folded along the opposed fold lines 20 and 18 so as to form end panels 26 and end flaps 28, illustrated in FIG. 3.

Referring now more particularly to FIG. 16, there is illustrated a side elevational view of a reciprocally movable platform assembly 111 on which the paperboard blank is disposed in the course of the end fold operation. While the blank 10 is being fed into the end fold station, the blank is prevented from moving laterally as a result of guide means, such as adjustable guide rail 140 seen in FIG. 18.

The feed finger assemblies 41 above described longitudinally move the paperboard blank until one edge end limit thereof, which ultimately defines an end panel flap, strikes stop finger 142, more clearly seen in FIG. 16. Finger 142 is pivotally mounted on pin 144 and is cammed into the erect package-stopping position illustrated in FIG. 16 by means of curved cam end limit 146 of a pusher arm 84 (see FIG. 11).

Thus, during approaching the end limit of its blank-advancing movement, the pusher arms 84 feed in a new blank by means of feed finger portions 42 and 44 onto the end fold station center plate or pad 112 and the side pressure plates or pads 113 and 115 (see FIG. 15). Simultaneously, with this feeding movement the pusher fingers 90, on the forward end limits of pusher arms 84, push a blank, which has been end folded, from the three pressure pads or plates toward the next station. Also, accomplished in the course of the feeding and package-pushing operations is the camming-up of stop finger 142 by means of the pusher arm cam surface 146, disposed rearwardly of pusher fingers 90. Upon engaging the stop finger the newly fed paperboard blank will now be in proper position for the end folding operation.

FIG. 21 is a perspective view illustrating paperboard blank 10 having a bacon batch 14 disposed thereon just as the feed finger portions 42 and 44 have reached the end limit of their feeding movement. Referring again to FIGS. 15 and 16, it will be noted that upon arriving on center pressing pad 112, the paperboard blank will engage a centrally disposed actuating arm 150 which, in turn, actuates underlying electric switch 160. Switch 160 will, in turn, allow energization of a solenoid valve and enable air to enter cylinder 152 (see FIG. 18), causing the piston therein to move downwardly thereby forcing piston rod 154 and punch plate 156 to move in a downwardly direction.

As plate 156 moves downwardly a punch pin 158, depending from and securely affixed to the plate, will engage the underlying pressure pad 113 and thereby force pads 113, 112 and 115 to move downwardly as a unit.

The center pressure pad 112 is mounted on an underlying transverse plate member 162 which is fixedly secured to elevator side bars 164 and 166 (see FIG. 18) and, accordingly, the three pressure pads move as a unit. Referring to FIG. 17, the bars 164 and 166 are guided in the course of their reciprocal movement by roller members 168 which rotatably engage cut-out portions 170 and 172 of guide plates 174 and 176.

The elevator side bars and center pressure pad 112 are normally resiliently urged into the upper position illustrated in FIG. 18 by means of the oppositely disposed elevator return springs 178, which are attached at one end limit to a base member 180 and at the opposed end limit of an elevator spring bar 182. Bar 182 resiliently urges in an upward direction elevator bottom brace 184. Therefore, when the piston in air cylinder 152 moves downwardly punch plate 156, return springs 178 are expanded as the elevator side bars 164 and 166 comprising a part of an elevator assembly move downwardly.

The means, which form the opposed end panels 26 and end flaps 28 from the blank 10, comprise the end fold fingers 186 and 188 which are seen in the retracted position in FIGS. 15, 16 and 18, and in the upper end-folding position in FIG. 20.

It will be noted from FIG. 16 that as the plate assembly 111 on which the blank 10 is resting moves downwardly, the end fold fingers 186 and 188 will engage cam rollers 190, resulting in inwardly pivoting movement of the end fold fingers about their pins 192. In the course of this inward pivotal movement, recess corners 194 of the end fold fingers (see FIGS. 16 and 20a), engage the opposed end portions of the blank 10 and force the same to fold along lines 18 and 20 (see FIG. 1), thereby forming the package end panels 26 and end flaps 28, illustrated in FIGS. 3 and 20.

In the normal course of the end-folding operation bacon or other comestible disposed on the blank bottom panel is automatically properly moved between the two blank ends. This centering operation is completely automatic and facilitates all subsequent operations.

It is essential in the course of forming end panels 26 and end flaps 28 of the ultimate package 12 that a certain fold sequence be followed. Opposed end portions of the blank must be initially folded first along fold lines 18, and as the end fold finger pivotal movement continues, then subsequently folded along fold lines 20 shown in FIG. 1. To assure initial folding along fold lines 18, before folding along fold lines 20, opposed hold-down fingers 196 and 198 are employed for reinforcing opposed portions of blank 10 adjacent fold lines 20.

End Hold-Down Fingers

Referring once again to FIG. 20, an end hold-down finger 196 bolted or otherwise secured to a pivotal casting 195 is illustrated in the retracted position following the end fold operation. In FIG. 21 the same end hold-down finger is illustrated in the vertical position of use prior to striking the underlying blank 10, adjacent fold line 20, so that the blank portion will be reinforced at this point allowing the end fold fingers to fold first along line 18 in the manner above described.

In FIG. 23, an end hold-down finger 198, bolted or otherwise secured to pivotal casting 197, is illustrated oppositely disposed to end hold-down finger 196. These two hold-down fingers are disposed over opposed ends of the righthand portion of the underlying blank 10, as viewed in FIGS. 20 and 21. The hold-down finger 198 is not visible in either of these latter two figures.

As noted from FIG. 23, as the punch plate 156 is lowered, end hold-down bars 200 and 202 on which the end hold-down fingers and castings are pivotally mounted are simultaneously lowered. The bars 200 and 202 are secured to an intermediate connecting block 204. As bars 200 and 202 are lowered, cam rollers 206 and 208 strike underlying inclined cam surfaces 210 and 212 respectively (see FIG. 22). It will be noted from FIG. 23 that rollers 206 and 208 of the end hold-down fingers 196 and 198 respectively, are spaced some distance from the underlying cam surfaces 210 and 212, cam surface 210 is shown in FIG. 21.

FIG. 24 shows hold-down finger 198 and associated mechanism, and it is apparent that as cam roller 208 descends, it will strike cam surface 212 and, as a result, roller 208 will pivot forward the finger 198, compressing spring 214, which continuously urges cam roller 208 outwardly into the position illustrated in FIG. 24. Following engagement with the cam surface, however, end hold-down trigger 216, comprising a pivotal latch, will pivot in a counterclockwise direction about trigger pin 218 and, as a result, latch end limit 220 of end hold-down trigger 216 will disengage from upper edge surfaces 222 of hold-down finger insert 193 formed on casting 197. A similar insert 191 disposed on casting 195 for engaging trigger 217 of hold-down finger 196 is illustrated in FIG. 18. As a result of the unlatching, hold-down finger spring 224, more clearly seen in FIG. 25, will be allowed to expand forcing end hold-down finger 198 and casting 197 to pivot about pin 226 and, as a result of such pivotal movement, move from the vertical position of FIG. 21 into the retracted position of FIG. 20.

In the normal course of operation the terminal end limit of the end hold-down fingers 196 and 198 momentarily engage opposed portions of blank 10 adjacent fold lines 20. The hold-down fingers are adapted to clear the surface of the underlying pressure plate 115 by an interval slightly greater than the thickness of the blank portion disposed thereon. As the three pressure pads, more clearly seen in FIG. 18, are in the process of being lowered, the end fold fingers 186 and 188 effect their folding operations on opposed end portions of the blank.

The provided mechanism is so designed that the hold-down finger cam rollers 206 and 208 engage cam surfaces 210 and 212 whereby the fingers 196 and 198 are triggered into their retracted positions, as the end fold fingers are in the process of bending the opposed portions of the paperboard blank along fold lines 18.

The end hold-down fingers 196 and 198 are withdrawn into the retracted position before the descending pressure plates and paperboard blank mounted thereon reach the lower end limit of their movements and before the end fold fingers have finished their folding steps. It is desired that the end fold fingers be retracted immediately after they have performed their reinforcing functions, whereby opposed blank portions are folded first along fold lines 18, so that the terminal end limits of the hold-down fingers will not be caught between the end flaps 28 of the paperboard blank and the underlying bottom panel portion.

It is apparent from FIG. 20 that if the end hold-down finger 196 remained in its vertical position (see FIG. 21) after the end hold-down fingers had formed the end flaps illustrated in FIG. 20, the terminal end of the end hold-down finger 196 would be caught beneath the right-hand end portion of the end flap illustrated in FIG. 20. Accordingly, the end hold-down fingers are designed to effect their reinforcing function as the pressure plates are being driven down by the punch pin depending from punch plate 156 (see FIG. 18) and are triggered to return to the retracted position before the final end-folding operations have taken place.

In FIG. 23, guide rollers 230 are illustrated having a projection of punch plate 156 disposed therebetween whereby the rollers and attached assembly may move as a unit with the plate. A roller guide clamp 232, in which rollers 230 are mounted, is in turn attached to an actuating bar 234 which is guided in the course of the reciprocal movement of punch plate 156 by means of the opposed gib plates 236 and 238. The punch plate 156 is itself guided during reciprocal movement by guide posts 157 which engage guide sleeves 159 (see FIG. 18). Opposed dovetails 234a of bar 234 slidably engage guide rollers 240 mounted on the gib plates in the course of resiprocal movement of the actuating bar 234. Rollers 230 rotatably engage the projection of punch plate 156 when lateral adjustment of the end hold-down assembly is carried out to conform with different blank sizes being processed at the end fold station 114.

The end hold-down fingers 196 and 198 are returned to their vertical reinforcing positions (see FIG. 21) when punch plate 156 moves upwardly, whereupon rollers 244 mounted on each casting 195 or 197 strike overlying reset devices. It will be noted from FIG. 23 that roller 244 strikes reset device (block 246), whereupon the finger 196 resumes its normal vertical position, and roller 244 strikes reset device (arm 248) and simultaneously finger 198 is reset in the vertical position.

In the course of the resetting operation, the two spring members 224 tending to inwardly pivot each of the two fingers 196 and 198 are compressed. Simultaneously the latch end portions 220 of each latch member 216 and 217 re-engage the top edge surfaces of each of the finger inserts 191 and 193. The fingers 196 and 198 are thus again locked in the vertical position until released by their respective members 216 and 217, as a result of camming action effected in the downward movement of the end hold-down assembly.

Because of space limitations, fingers 196 and 198 are only disposed to engage right-hand portions of the blank (see FIGS. 20 and 21). Opposed left-hand portions of the blank, adjacent the bottom-panel fold line 22 are reinforced by means of spring hold-down members 252 having spring loaded projecting pin portions 254 extending therefrom. One of the members 252 is clearly seen in FIGS. 18 and 21. FIG. 21 illustrates the end fold fingers prior to downward movement of the punch plate. FIG. 20 illustrates the end fold station after the paperboard-supporting pressure pads have reached their lower end limits of movement. It will be noted from FIG. 20 that the spring loaded hold-down pins 254 of the fingers 252 urge opposed ends of the left-hand portion of the blank adjacent fold line 22, against underlying pressure pad 113.

*Stripper Fingers of End Fold Station*

Substantially simultaneously with the actuation of the end fold fingers 186 and 188, opposed stripper fingers 258 and 260 (see FIG. 19) pivot downwardly whereby the blocks 262 carried thereby are disposed in the central passageway 187 of each finger in the manner illustrated in FIG. 20. Blocks 262 are adjustably positioned on the fingers to accommodate packages of different heights. In the down position the lower edge surface 264 of each block 262 (see FIG. 19) engages an upper surface portion of the inwardly folded end flaps 28 formed by the end fold fingers.

The two stripper fingers 258 and 260 are actuated by two stripper finger cam deflectors 268 and 270, respectively. As will be noted from FIG. 19, as punch plate 156 is lowered, mounting brackets 272 and 274 on which the fingers are mounted by means of pins 276 and 278 are simultaneously lowered until pin 280 of finger 258 engages cam surface 282 of the cam deflector 268. Simultaneously with this engagement, pin 284 of finger 260 engages cam surface 286 of cam deflector 270. The two cam deflectors 268 and 270 do not move with the punch plate 156 and are fixedly mounted to stationary base member 290.

As a result of the pin engagement of each stripper finger with the lower cam surfaces of their respective cam deflectors, the block 262 of each stripper finger pivots downwardly into the position illustrated in FIG. 20. It is the function of the stripper fingers to retain the formed end portions of the blank 10 in the configuration illustrated in FIG. 20, while allowing the end fold fingers 186 and 188 to retract to their inoperative position of FIG. 16 when the air cylinder 152 and its piston are actuated to raise the elevator assembly above described, including the pressure pads 112, 113 and 115 on which the paperboard blank is mounted.

As will be noted from FIG. 16, upward movement of center pressure plate 112 withdraws the end fold fingers 186 and 188 from engagement with cam rollers 190 and as a result, torsion springs, mounted about the pivot point of each finger and urged against the fingers, come into play forcing the stripper fingers to pivot outwardly into the position illustrated. Although the fingers are retracted from the position of FIG. 20 into the position of FIG. 16, the stripper fingers remain in place on the upward movement of punch plate 156 until pins 280 and 284 of stripper fingers 258 and 260 engage upper cam surfaces 292 and 294 of cam deflectors 268 and 270, respectively. At this time the two stripper fingers are forced to pivot outwardly into the position of FIGS. 19 and 21.

The stripper fingers pivot inwardly and outwardly in an instantaneous manner as a result of the action of stripper finger springs 298 (see FIG. 19). When pivot points 300 and 302 defining the juncture of springs 298 with the stripper fingers move over the invisible axis adjoining the stripper finger pivot points 276 and 278 and the end limits 306 and 308 about which the spring housing assembly pivots, a toggle action is created. The stripper fingers are then snapped inwardly or outwardly, depending upon the direction of movement of pivot points 300 and 302.

The stripper fingers will be withdrawn into the position of FIG. 19 only after the pressure plates have raised the folded end portions of the blank a sufficient distance so that the inwardly projecting end flaps 28 are able to engage the guide bar 310, also seen in FIGS. 20 and 21. The guide bar 310 is supported at opposed end portions by laterally adjustable supporting posts 312, both of which are seen in FIG. 19.

Glue Dispensing Tips

In the course of the end-folding operation illustrated in FIG. 20, glue is dispensed along the opposed end portions of the paperboard blank lid 30 by means of glue dispensing tips 314, more clearly seen in FIG. 21. The tips are arranged in opposed series so as to engage opposed side edge portions of the blank lid when the punch plate 156 is at the lower end limit of its movement. It will be seen from FIGS. 18, 20 and 21 that the glue dispensing tips 314 are mounted on a supporting plate 316 which is, in turn, supported by overlying punch plate 156 by means of the connecting bracket 318. The opposed batteries of glue dispensing tips are adjustable to accommodate blanks of varying size, as indicated by slots 320 formed in support block 316 for the glue dispensing tips.

Each tip 314 has a projecting spring loaded pin 322 extending therefrom. Pins 322 upon engaging the underlying lid 30 of the blank urge the blank lid against supporting platform 47, remove overlying valve members not illustrated within tips 314 from their valve seats and allow glue or adhesive to be dispensed from the lower tip end limits. The particular construction of the glue dispensing tips is well-known and per se does not comprise any part of this invention. The glue dispensed by the tips is forced by compressed air from a glue pot (not shown). The dispensed glue has a resin base and will adhere to wax surfaces. The glue adhesively secures opposed edge end portions of the lid 30 to end flaps 28 of the package, as will hereinafter be described.

Following return of punch plate 156 to the elevated position, the partially formed package which has been end folded and which has had glue disposed along opposed end portions of the lid portion thereof is ready for removal from the lid-fold station by means of pusher arms 90, previously described in the discussion of FIG. 11.

MASH ROLL AND PLOW STATION

As above mentioned, pusher arms 84, in addition to having mounted thereon feed finger components 44 and 42 which feed packages into the above described end fold station, also have mounted on the forward end portions thereof pusher fingers 90 whose function it is to push the partially formed package (see FIG. 20) from the end fold station for further processing and package completion.

Although the pusher fingers 90 are shown in their up position in FIGS. 11 and 14, in the course of package removal from the end fold station, such fingers are lowered in the course of the return stroke of the pusher arms 84 because of the downward movement of the three pressure pads 112, 113 and 115 (see FIGS. 15, 16 and 18). When pusher arms 84 are at the end limit of their feeding motion, as indicated in FIG. 11, the package in the end fold station has been pushed therefrom and a new paperboard panel is moved into the end fold station.

The pusher arms 84 are in the process of retracting toward drive bars 82 when the side pressure pads 113 and 115 of FIGS. 15 and 16 are in the course of moving downwardly. Opposed edge portions of side plates 113 and 115 will, therefore, engage the rollers 94 disposed on each of the pusher fingers 90, allowing the pusher fingers and pusher bar assembly to return without pusher fingers in any way interfering with the end fold operation above described.

The relative size of the mash roll and plow station may be gathered from an examination of FIGS. 7 and 14. In each of these latter two views, bracket 324 identifies the extent of the mash roll and plow station of the provided apparatus.

Referring now more particularly to FIGS. 27 through 29, a flight entrance shaft 328 is illustrated on which is mounted a drive sprocket 330 which, in turn, drives sprocket 332 keyed to shaft 334. A drive sprocket follower finger 336 engaging slot 338 of drive sprocket 330 enables desired relative disposition of the illustrated components to be readily effected when it is desired to process paperboard blanks of a new size.

Driven sprocket 332 has disposed adjacent thereto lower gear 340 which meshes with overlying counterrotating gear 342 keyed to shaft 344. Therefore, lower mash roll 348 keyed to shaft 334 will rotate concurrently to upper mash roll 350 keyed to shaft 344.

It is the function of the mash rolls to engage the paperboard blank portions disposed adjacent the fold line 22 (see FIG. 1) whereby lid 30 may be readily urged into overlying relationship with the underlying end flaps in the lid-fold station.

Prior to urging the paperboard blank portions adjacent to fold line 22 together, the lid 30 of the paperboard blank engages lid plow 352, clearly illustrated in FIGS. 27 and 28. Plow 352 raises the lid into engagement with an undersurface portion of the lid deflector rail 354. The rail functions to retain the blank lid in overlying relationship with the underlying end flaps after the lid plow has forced the lid to pivot into overlying relationship with the remaining portion of the paperboard blank as a result of the lid following the contour of the lid plow.

At the instant the paperboard blank reaches the mash rolls 348 and 350, the lid 30 will be in substantial overlying relationship with the underlying bottom panel of the blank. The blank portions adjacent fold line 22 will thus enter into the V-shaped opening, more clearly seen in FIG. 9, defined by the opposed mash rollers and in the course of moving therebetween the paperboard engaged will be compressed together thereby removing most of the "spring" which the blank hinge along fold line 22 may possess, tending to urge the lid from the underlying paperboard blank bottom.

FIG. 35 is a perspective view illustrating the manner in which a package which has been partially formed is conveyed from the plow and mash roll station into the lid-fold station. Illustrated flight 356 is mounted on a sprocket chain 358. Chain 358 engages a sprocket wheel (not illustrated) mounted on flight entrance shaft 328 at one end limit (see FIG. 27). It will be further noted from FIG. 35 that the flights moving the partially completed package slide over guide rails 360. The package end portion oppositely disposed to the portion engaging the mash rolls 348 and 350 slidably moves along a guide rail 362 assuring proper package disposition for processing.

LID-FOLD STATION

Referring once again to FIGS. 7 and 14, a lid-fold station 363 is therein illustrated adajcent the mash roll and plow station 324. It is the function of the apparatus of the latter station to iron the lid 30 of the package, partially formed from paperboard blank 10, over the inwardly projecting end fold flaps 28 whereby the adhesive previously dispensed on the opposed lid edge portions will be urged against the underlying projecting flaps in the course of an "ironing" action and define a smooth upper surface of pleasing appearance. Adjacent the lid-fold station a novel tucker bar assembly bends end flap 32 of lid 30 along fold line 24 and tucks the same beneath the free edge of bottom panel 19 (see FIG. 1) of the partially formed package following the lid-ironing action.

Referring now more particularly to FIGS. 31 and 32, a stop finger 366 is illustrated mounted on a transverse pin 368. It will be noted from FIG. 34 that finger 366 may be adjustably positioned by means of an adjusting lever 367 which may engage various openings in a position lever 370, whereby the finger may be disposed at the appropriate height for purposes of defining the end limit of movement of a package entering the lid-fold station.

It will also be noted from FIG. 34 that stop finger 366 which is pivotally mounted at 372 on a pivot block 374 is actuated into the elevated stop position and retracted to a lower position permitting packages to pass thereover by means of a cam lever 376 connected to the finger at joint 378. The cam lever 376 has a cam follower 385 which is urged against the periphery of a stop finger cam 380 by means of spring 382 which is mounted on a supporting post 384 at one end limit and mounted on the stop finger cam lever 376 at the opposed end limit. It is the function of cam 380, which is rotating on lid-fold cam shaft 386, more clearly seen in FIG. 31, to urge finger 366 into the upright stop position in the course of package entrance into the lid-fold station. The finger is later retracted following the lid-fold operations in timed relationship therewith enabling the packages to pass therefrom as will hereinafter be discussed in greater detail.

In the course of moving into the lid-fold station, the partially formed package will engage actuator 388 of electric switch 390, more clearly seen in FIG. 33. Actuator arm 388 projects slightly above package engaging surface 392 (see FIG. 31) so that the same is automatically engaged in the course of package movement into the lid-fold station. The switch 390 permits actuation of a solenoid valve (not illustrated) which, in turn, allows air to enter cylinder 394, more clearly seen in FIGS. 31 and 34.

Air enters the bottom of cylinder 394 by means of line 396 (see FIG. 34); air regulator 398 is disposed in this latter line. Air enters the upper portion of cylinder 394 by means of line 400, more clearly seen in FIG. 34.

Air upon entering the bottom of cylinder 394 forces piston rod 402 and clevis 404 attached thereto to move in an upwardly direction. In the course of the upward movement, lid-fold plate assembly 406 pivotally mounted on lid-fold pivot shaft 408 is simultaneously forced to pivot downwardly in the manner illustrated in FIG. 32 as lever arm 410 thereof pivotally engaging clevis 404 is forced to pivot upwardly.

It will be noted from FIG. 32 that opposed ends of pivot shaft 408 of the lid-fold plate assembly 406 engage elongate bearing slots 412 of uprights 413. It will also be noted from FIG. 34 that opposed ends of pivot shaft 408 engage springs 414 which resiliently urge the pivot pin downwardly in the direction of spring adjusting blocks 416 on which the lower end limits of the springs 414 are mounted.

It is seen in FIGS. 31 through 33 that the lid-fold plate assembly 406 is made up of a number of discrete components. Lid-fold breaker plate 420 (see FIGS. 31 thorugh 33) is fixedly secured to two fold breaker arms 422 by means of screws 424 or other equivalent means. The opposed ends of the lid-fold breaker arms 422 engage fold breaker shaft 428, which is also mounted above ironing fold plate 430 and engages apertured lug portions 432, as illustrated in FIGS. 33 and 35.

Ironing plate 430 is secured to fold plate arms 434 by means of screws 436 or other equivalent securing means. The fold arms 434 are not secured to the lid-fold breaker plate 420, but are formed with connecting bar 431.

It will be noted from FIGS. 31 and 32 that each lid-fold breaker arm 422 has a slotted end portion oppositely disposed to the end engaging the fold breaker shaft 428. Slots 440 engage guide rolls 442 which are mounted on supporting blocks 445 (see FIG. 33). Both plates 420 and 430 have arcuate lateral cross sections whereby the concave surface defined by their combined undersurfaces substantially conforms to the lid configuration of the blank upon being urged against the underlying end flaps.

In the normal course of lid-fold operation a partially formed package is moved onto platform 392 (see FIG. 31) after having been conveyed thereto by means of intermittently moving flights 356 illustrated in FIG. 35. Stop finger 366 properly positions the partially formed package relative to the lid-fold plate assembly as above described. The stop finger determines the proper package position along the longitudinal axis of the lid-fold station, and assists in retaining the engaged blank end panel in desired vertical disposition prior to actuation of the end fold plate assembly 406.

The switch 390 being actuated, piston rod 402 of cylinder 394 moves upwardly pivoting the lid-fold plate 430 and the lid-fold breaker plate 420 about pivot pin 408. It is seen in FIG. 32 that lever arm 410 comprises a continuation of one fold plate arm 434. At the end limit of this initial pivotal movement, a distal terminal edge 446 of lid-fold plate 430 strikes fixed anvil member 448, more clearly seen in FIGS. 31 and 32. By employing a two piece assembly 406 contact may be effected thereby with the anvil despite the presence of a batch hump which would prevent anvil engagement if an integral plate were involved. The spring biased pivot shaft enables the plate assembly 406 to roll across the entire blank width even though a hump be engaged.

In FIG. 32 the raised dotted-line position of the fold plate assembly 406 is that assumed preliminarily to actuation of switch 390; the solid line position of the plate assembly 406 is that assumed at the instant the anvil 448 is struck by the assembly. Because of the elongate bearing slots 412 in the uprights 413, piston rod 402 and pivot pin 408 may continue in an upwardly direction following initial impact between edge 446 of fold plate 430 and fixed anvil 448.

The new plate assembly position after the additional terminal portion of the upward movement of piston rod 402 is illustrated in FIG. 32. The latter movement also forces distal edge 446 of fold plate 430 to pivot about its point of engagement with the fixed anvil 448. As a result thereof, the forward edge of plate 430 slightly moves forward a small fraction of an inch simultaneously pulling the engaged portion of the underlying package lid therewith. In FIG. 32a the forward movement of ironing plate 430 as a result of pivoting about edge 446 is exaggerated. Slots 440 of fold breaker arms 422 serve to guide the terminal movement of fold breaker plate 420 in the course of the terminal upward movement of piston rod 402.

The pulling of a distal portion of the lid 30 away from fixed upright 413 renders the entire lid taut so that the same is urged into tight engagement with the underlying inwardly projecting end flaps 28 of the package (see FIG. 3) and effects an ironing action on the lid. The lid-fold breaker plate 420 assists in the course of the pulling and ironing of lid 30 over flaps 28. The breaker plate functions to force the initial folding action of the blank lid 30 over the end fold flaps eliminating wrinkles, and after the anvil is struck a very slight motion thereof toward the anvil effects an effiecient and desirable ironing action on the lid portions engaged.

Since a resin-base adhesive which remains tacky at room temperature had previously been dispensed on the opposed end portions of the lid undersurface, the lid-fold breaker plate and ironing plate portions of the plate assembly 406 are seen to function as means for ironing the package lid into adhering engagement with the underlying end flaps. Following this portion of the lid fold operation a cross section of the partially finished package is that illustrated in solid lines in FIG. 4.

*End Flap Folding and Tucking Operation*

Referring again to FIG. 4, it will be noted that an operation remains to be performed on the package being processed whereby end lid flap 32, illustrated in FIG. 4, will be bent along fold line 24 (see FIG. 1) and tucked in underlying relationship with a free edge portion of panel 19 of the paperboard blank which has now been substantially completely formed into the package 12 illustrated in FIG. 2.

The stop finger 366, previously described, terminated the longitudinal movement of the package being processed in the lid-fold station. The lateral disposition of the partially formed package in the lid-fold station is regulated by an edge hold guide bar 452, more clearly seen in FIG. 38 and also illustrated in FIGS. 39, 40 and 41. The edge hold guide bar is secured to parallel supporting bars 454 as illustrated in FIGS. 38 and 39; the latter bars are reciprocally movable in guide sleeves 456.

Bolted or otherwise suitably affixed to the lower end limits of the parallel bars 454 is a transverse connecting bar 458 on which a cam follower 460 is mounted. Depending from opposed under surface portions of the edge hold guide bar are spaced spring guide pins 462. The pins engage compression springs 464 which depend into apertures 466 formed in plate member 468, in which guide sleeves 456 are also disposed. It is apparent from FIG. 38 that springs 464 tend to urge the edge hold guide bar 452 away from the underlying plate 468. Cam follower 460 of the guide bar assembly engages guide bar cam 471 in the manner most clearly seen in FIG. 37. Engagement of cam follower 460 and cam 471 is also illustrated in dotted lines in FIG. 41.

The apparatus operation is so timed that the distal edge 19 of the paperboard blank is guided laterally in the lid fold station by means of projecting tine portions 470 and 472, more clearly seen in FIG. 38. The three tines 470 are adapted to engage end portions of paperboard blanks of various lengths. The edge hold guide bar 452 thus properly positions the paperboard blank laterally prior to pivotal movement of the lid-fold plate apparatus above described.

As was also previously described, following movement of lid fold apparatus, the distal end of the fold plate tightly urges a lid end portion against the fixed anvil member 448 of FIG. 31.

FIG. 43 illustrates a tine of the edge hold guide bar 452 in proper guiding position prior to the lid-fold operation, the lid 30 and lid flap 32 being illustrated in FIG. 43 in a free, overlying disposition relative to the underlying package components. After the ironing plate 430 has engaged the package lid 30, the guide bar 452 is moved by cam 471 from the upper position of FIG. 43. Simultaneously with this cam action, a tucker bar or tuck fold bar 474 (see FIGS. 35 through 37 and 43 through 46) is pivotally moved about pivot pins 476, mounted on opposed portions of supporting tuck fold arm 478, by means of cam 480, more clearly seen in FIG. 37. Cam 480 engages tucker bar cam roll 482, which is secured to a cam follower mounting bracket 484 which is, in turn, secured to the tucker bar 474. It is most apparent from FIG. 49 that tuck fold bar 474 is relieved at 475 on its operative surface to permit a superposed relative disposition with edge guide bar 452 in the manner illustrated in FIG. 43.

Referring now to FIG. 43, it is seen that in order to bend lid end flap 32 relative to the lid 30, the tucker bar 474 must rise above the lid end flap so that the bottom projecting tongue 488 thereof may urge the lid end flap downwardly causing the same to fold along fold line 24, which should be disposed substantially over the distal edge of underlying fixed anvil 448. The action of cam 480 is such that the tuck bar 474 is initially pivotally moved up and away from the fixed anvil in the manner illustrated in FIG. 44, after which cam 480 forces the tucker bar down and in the direction of the lid flap, in the manner illustrated in FIGS. 45 and 46. Tongue 488 may then bend the end lid flap 32 along the fixed anvil distal edge in the manner illustrated in FIG. 45 and in cooperation with overlying triangular projection 490 formed as a result of central slot 489 effect a tucking action, illustrated in FIG. 46.

It will be noted from FIGS. 45 and 46 that when the final lid-flap bending and tucking operations are being carried out, the edge hold guide bar 452 has been retracted by its cam 471 in the manner previously described. It will also be noted from the latter two figures that the ironing plate 430 is in place when the tucking operation is effected.

FIG. 49 illustrates tucker bar 474 in a raised position prior to moving downwardly for bending and tucking a lid end flap in the manner illustrated in FIGS. 45 and 46. Following the lid folding and tucking operation it will be noted from FIG. 46 that the under-surface of the lid flap 32 must still be urged into engagement with an under-surface edge portion of the package bottom panel.

*Pivotal Action of Tucker Bar and Tucker Bar Arms*

It will be appreciated from FIGURES 36 and 37, as well as FIGS. 43 through 46, that although cam 480 may impart pivotal movement of tucker bar 474, such movement is limited by the extent that bar 474 may pivot about pins 476. The pivotal movement of bar 474 toward anvil 448 relative to its pins 476 is limited by a stop pin 498 which projects from an underlying stop bar 500 (see FIGS. 36 and 37).

Tucker bar 474, in the course of pivotal movement about pins 476, is overcoming the tension of light springs 502 (see FIG. 37) which engage rear portions of the tucker bar, as illustrated, at one end limit and which are mounted on a fixed support surface 509 at the opposed end limits. Accordingly, cam 480 will initially pivot tucker bar 474 about its pins 476 until an under surface portion of the tucker bar engages stop pin 498 of bar 500, which is secured to tucker bar arm 478.

In order, therefore, for the tucker bar to continue its pivotal movement in the direction of the fixed anvil 448, the tucker bar arm 478 (see FIG. 40) on which the tucker bar is mounted at opposed portions must pivotally move toward the fixed anvil. The tucker bar arm is urged from its normal vertical position by action of the cam 480. After tucker bar 474 has pivoted as far as possible about its pins 476, continued rotatable engagement of cam 480 with cam follower 482 will force the entire tucker bar arm assembly to pivot in the direction of fixed anvil 448 in the manner illustrated in FIG. 37. Heavy springs 504 engage opposed portions of the tucker bar arm at one end limit and are secured to fixed support plate 505 at opposed end limits. Cam 480 is seen, therefore, to effect two pivoting actions; the first pivoting action is that of the tucker bar about its pins 476 and the second action is that of the tucker bar arm 478 about its pivot 496.

*Safety Cam Feature*

In the event that an obstruction were disposed on the fixed anvil surface preventing folding and tucking operation of the tucker bar 474 and resulting pivotal movement thereof relative to supporting arm 478, safety cam 492 riding over cam surface 508, which is mounted on cam hub 510 of the cam assembly illustrated in FIG. 37 prevents outward pivotal movement of the tucker bar arm 478. Cam 508 is designed to permit outward pivoting of arm 478 only if the tucker bar 474 is in proper position relative thereto. By virtue of safety cam 492 moving over cam surface 508, tucker bar arm 478 is not able to pivot outwardly unless the pivotal movement of tucker bar 474 is in proper sequence with the remaining operations carried out at the lid-fold station.

Referring now to FIG. 6, it will be noted that as the package proceeds axially in the apparatus 38, the same will leave the lid-fold and tucking station 363 and enter adjacent heating station 512 (see FIG. 7). Following processing in the lid-fold station the paperboard blank having the partial cross sectional configuration of FIG. 46 is again longitudinally moved by means of the intermittently movable conveying chain 358 of FIG. 30, which is also illustrated in FIG. 6, as well as the chain flights 356 which are mounted on the conveyor chain. FIG. 35 also illustrates flights 356 mounted on chain 358 in position for moving a package being processed in the lid-fold station after all operations have been completed in the latter station.

HEATING STATION

The final step in the lid-fold station comprises elevation of the lid-fold plate components into the elevated position of FIG. 49 as a result of piston reversal in cylinder 394. When the lid-fold plate is in the raised position, the conveyor chain 358 is actuated to move the partially formed package between upper and lower heater bars 514 and 516 which are disposed adjacent one terminal end of the previously described tucker bar 474 in the manner illustrated in FIG. 30. FIG. 47 illustrates the V defining disposition of the upper and lower heater bars 514 and 516, respectively, in which electrical heater elements may be disposed as at 520. Temperature sensitive switches (not illustrated) sensitive to the heater bar temperatures which regulate current input to the heater elements may also be employed. The heater bars are bolted to upper and lower mounting blocks 522 and 524 and edge guide bar 526 assists in guiding one edge limit of the package 12 in the course of being moved over the heater bars.

It is the function of the heating station to activate the heat activatable adhesive 34 disposed along under surface portions of the lid flap 32 and on corner portions of the bottom panel as illustrated in FIG. 1 of the drawing. It is apparent from FIG. 47 that although the adhesive 34 is activated in the heating station, no substantial compression forces are therein imparted to the lid end flap and engaged portion of the package bottom panel.

COOLING STATION

The package is then moved into a cooling station which not only serves to cool the heated package portion which is illustrated in FIG. 47, but in addition serves to tightly compress together the end flap and the edge portion of the package bottom panel beneath which the lid end flap is folded. In FIG. 7, the numeral 528 identifies the cooling station.

FIG. 42 comprises a side elevational view partly in section of cooling station 528. In the cooling station an idler sheave 530 is illustrated mounted on block 532 in scpaced relationship with belt drive gears 534 and 536. Gear 534 is mounted on block 538 and gear 536 is mounted on drive shaft 540. A pulley 542 is keyed to shaft 546 on which drive gear 534 is also keyed. Pulley 542 engages a cooling and pressure belt 548 which is driven about idler sheave 530 and pulley 542 with the assistance of the pulley idler and take-up rollers 550 and 552.

The belt 548 is also guided in the course of its movement by means of flanged belt guide rollers 554 which engage and are rotatably driven by the belt. Disposed beneath the belt guide rollers are the lower compression rollers 556. It will be apparent from FIG. 42 that the moving package portion containing the folded lid flap 32 passes from between the upper and lower heater bars 514 and 516 to a position between the lower surface of the moving belt 548 and the upper surfaces of the lower roller members 556. The belt 548 moves at a greater speed than the conveying flights 356 of the chain 358, illustrated in FIG. 30, whereby the packages are pulled from their pushing flights in the cooling station. Thus the flights do not catch and damage a finished package upon turning down and reversing their movement, after the package is completely processed in the terminal end portion of the apparatus illustrated in FIG. 42.

It is apparent from FIG. 48 that lower rollers 556 coact with belt 548 to tightly compress lid end flap 32 against the illustrated edge end portion of the paperboard blank bottom panel. The heat activatable glue, which was activated in the heating station, is allowed to set in the course of passing through the cooling station.

Code Dater

Referring again to FIG. 42, it will be noted that a package carried between belt 548 and bottom rollers 556 after passing beyond drive pulley 542 is engaged by counter-rotating back-up roller 558 and a code dater roller 560 on which a removable plate 562 is mounted for purposes of imprinting a date on the lid flap of the now completed package as the same exits from the processing apparatus.

Apparatus Motive Means

FIG. 42, in addition to illustrating the cooling station and code dating apparatus components of the provided machine, also illustrates the main drive motor 564 bolted to a lower frame member 566 of main frame 600. The output shaft of the drive motor (not illustrated) rotatably drives belt 568 which engages sheave 570 of speed reducer 572. A speed selector control 574 is also illustrated in FIG. 42. The speed reducer output pulley 576 rotatably drives belt 578 which, in turn, drives sprocket 580, which, in turn, is keyed to a rack drive shaft 582.

Rack drive shaft 582 reciprocally moves drive rack 584 by means of the connecting crank 586 on which is mounted an adjusting link 588. The adjusting link, in turn, engages rack link 590. It is seen, therefore, that motor 564 indirectly reciprocally drives rack drive shaft 582. The rack 584 as a result of the motion of crank 586, reciprocates, alternately moving ratchet drive gear 592 which is secured to pawl bracket 594, as is more clearly seen in FIG. 50.

It will also be noted from the latter figure that rack 584 is supported in rack bearing 596 in the course of reciprocal movement. The pawl bracket 594 has mounted thereon a drive pawl 598, as well as a disengagement roller 600. Neither drive gear 592 nor pawl bracket 594 is keyed to the flight drive shaft 602 on which mounted. Ratchet 604, having one tooth thereon (such ratchet being illustrated in perspective in FIG. 54) is keyed to flight drive shaft 602.

As was above mentioned, the flights 356 of the conveyor chain which move the processed package from the lid-fold station through the heating station and into the cooling station are intermittently moved as a result of being driven by drive ratchet 604.

Ratchet 604 is keyed to shaft 602 and is driven by drive pawl 598, which engages tooth 603 of ratchet 604 during the drive stroke of rack 584.

FIG. 51 illustrates drive pawl 606 which is mounted on pawl bracket 594. In FIG. 51, drive pawl 606 is rotating in the course of the non-driving stroke of rack 584 whereby gear 592 is rotated together with plate 594 until pawl 606 engages tooth 603 of drive ratchet 604. At the approximate time that pawl 606 engages tooth 603, rack 584 will move in the opposite direction driving ratchet 604 and shaft 602 to which it is keyed.

Ratchet 608 which is also keyed to flight drive shaft 602, as illustrated in FIG. 50, comprises a means for limiting exactly the drive movement effected by rack 584 through drive ratchet 604 on shaft 602. Ratchet 608 has a tooth 610 (see FIG. 52) which is adapted to engage stop pawl 612 pivotally mounted at 614 on an adjustable over-travel pawl mounting plate 616, illustrated in FIGS. 50 and 52.

It will be noted from FIG. 50 that adjustable plate 616 is adjustably mounted on a base block member 618. The over-travel pawl 612 is intended to engage tooth 610 of over-travel gear 608 so as to precisely limit the rotational movement of shaft 602 imparted thereto by ratchet gear 604. It is apparent that at high speeds, the reciprocating motion imported to drive ratchet gear 604 may give rise to a tendency of the shaft 602 to over-travel in the flight drive stroke direction of its rotary movement.

It is a function, therefore, of pawl 612 to stop the shaft by means of over-travel ratchet gear 608 when shaft 602 has rotated through the precise angle desired. When it is time for drive ratchet 604 to again be engaged and driven by pawl 606 of drive plate 594 (see FIG. 51) disengagement roller 600 of drive plate 594 will be in a position raising over-travel pawl 612 from engagement with tooth 610 of over-travel ratchet gear 608. The shaft 602 may then be driven until the over-travel pawl 612 again meets stop tooth 610 of gear 608.

It is seen from the foregoing, therefore, that the various operations carried out in the above-described apparatus are all relatively timed. Referring again to FIG. 14, it will be noted that fly wheel 124 is continuously in operation being indirectly driven by a sprocket mounted on shaft 582. Accordingly, the feed and pusher fingers integrally driven by the fly wheel are also in continuous motion.

Because of the air cylinder actuating switches in the end fold and lid-fold stations previously described, none of the apparatus in either of these two stations functions until the switches previously mentioned are actuated by the presence of a package arriving in the station. The feather switches do not per se actuate mechanisms which immediately result in actuation of the air cylinders, but merely assist in closing a circuit so that when the timing is proper, the air cylinders of the end fold and lid-fold stations may operate.

Proper operational sequence in the various apparatus stations is regulated in part by means of switch actuators which are mounted on drive shaft 134 (see FIG. 14). Projecting actuators mounted on shaft 134 engage switches (not illustrated) disposed adjacent the drive shaft which, accordingly, actuate conventional four-way solenoid valves, such as solenoid valve 131 of FIG. 14, which, in turn, regulate the admission of air into the two cylinders comprising the motive means for certain operational steps in the end fold and lid-fold stations.

Drive shaft 134, as indicated in the latter figure, is driven by means of a drive sprocket 133 which is, in turn, driven by a sprocket chain communicating with a drive sprocket mounted on a drive shaft actuated indirectly by motor 564 of FIG. 42.

FIG. 55 illustrates a wiring diagram of the electrical components of the provided apparatus. It will be noted from FIG. 55 that two manually operable control switches 630 and 632 are provided which are preferably disposed on opposed sides of the machine to insure safety of operation. The end fold station switch 160 and lid-fold station switch 360 are illustrated. Switches 634 and 636 comprise two of the switches mounted adjacent drive shaft 134 of FIG. 14, which are actuated by cams disposed on shaft 134 when the overlying feeding members are in proper disposition for end folding operations to take place.

Solenoid valve 131 (also seen in FIG. 14) comprises means regulating the movement of the piston within air cylinder 152 of the end fold station. Solenoid valve 639 regulates the piston movement in cylinder 394 of the lid-fold station. Switches 640 and 642 are those switches actuated by cams disposed on shaft 136 illustrated in FIG. 14 which regulate movement of the lid-fold plate assemblies through cylinder 394, so that the feed fingers are in proper disposition when lid-fold apparatus is actuated. Pressure sensitive switch 645 terminates apparatus operation when the pressure in the line operating the air cylinders 394 and 152 falls below a predetermined minimum.

It is seen from the foregoing, therefore, that an apparatus for folding a paperboard blank into a final completed package of pleasing appearance has been provided. The apparatus feeds the paperboard blank into a novel end fold station whereby end panels and inwardly disposed end flaps are formed. In the course of the end folding operation, bacon or other comestible disposed in the upper surface of the paperboard blank is centered as a result of the folding operation of fingers 186 and 188 which are continuously urged into the retracted position by springs 183 (see FIG. 16). Because of the low temperatures of bacon when packaged (usually about 20°–27° F.), it possesses a minimum stiffness or rigidity which facilitates rearrangement of the batch of bacon between the blank opposed end portions.

Following the end fold operation, the paperboard blank is automatically removed through a mash roll and plow station wherein a lid is brought into overlying relationship with the underlying bottom panel portion of the package.

The package in such condition is brought to a stop in predetermined position in a lid-fold station whereat the package lid is ironed over inwardly disposed underlying end flaps of the paperboard blank. A novel tucker bar assembly then folds the distal flap of the lid beneath an edge portion of the package bottom panel. Following this operation, the package is automatically conveyed through heating and cooling stations wherein adhesive previously disposed on predetermined portions of the paperboard blank are activated and tightly squeezed into engagement with paperboard portions of the package member.

Adjustments whereby the apparatus may be readily adapted to process blanks of different size may be effected at each of the stations with a minimum loss of operating time. For instance, change of guide bar dispositions may be simultaneously made for all the stations of the machine. The above described apparatus may efficiently process between about 25–60 packages per minute. The efficiency of machine operation results in a bare minimum of wastage from damaged packages. Because of the unique apparatus design a package will be forced through the machine if inadvertently jammed on an apparatus component thereby contributing to the operation efficiency with no danger of apparatus breakage.

It is believed apparent from the foregoing description that certain modifications may be made in the apparatus above-described. It is intended, therefore, that this invention be limited only by the scope of the appended claims.

We claim:

1. In an apparatus for folding a paperboard blank, the combination comprising a supporting base, actuator means so positioned as to be engaged by a paperboard blank disposed on said base, pivotally mounted folding plate means movable over said base, anvil means disposed adjacent one edge of said base, motive means rendered operable by said actuator means for moving said folding plate means over said base whereby the distal edge of said plate means strikes said anvil means and is stopped thereby and for pivotally moving the distal edge of said plate means over said anvil means in the same direction of pivotal movement as that effected by said folding plate means after said anvil means is struck by said plate means.

2. In an apparatus for forming a paperboard blank into a package, the combination comprising first conveying means for conveying said blank along a first predetermined path, reciprocally movable platform means disposed adjacent the terminal end of said first conveying means for receiving said blank, folding finger means supported on opposite portions of said platform means simultaneously moving toward and away from each other in the normal course of platform means reciprocal movement for inwardly folding opposed end portions of a first segment of said blank disposed thereon, means engaging the end-folded blank for removing said blank from said platform means following said reciprocal movement and moving said blank along a second predetermined path; and means so disposed relative to said second predetermined path that a second segment of said blank contiguous with said first segment is engaged and folded in overlying relation with said first segment in the course of said blank movement.

3. In an apparatus for folding a paperboard blank, the combination comprising a paperboard blank supporting means, pivotally mounted folding plate means reciprocally movable into overlying relation with at least a portion of said supporting means, anvil means so positioned as to engage a distal edge portion of said plate means at the end limit of said plate means movement, and motive means operatively connected to said plate means for pivotally moving said folding plate means into engagement with said anvil means and pivotally moving the edge portion of said plate means engaging said anvil means over said anvil means after said plate means has engaged said anvil means so as to rotate said plate means edge portion in the direction of pivotal movement imparted to said folding plate means.

4. In a method for assembling a collapsible paperboard receptacle formed from a paperboard blank having fold lines defining a bottom panel, end panels connected to said bottom panel, end panel distal flap portions integrally formed with said end panels and a top cover having a top cover distal flap portion, said top cover joining said bottom panel along one edge of said bottom panel transversely disposed to said end panels, the steps comprising inwardly folding said end panel distal flap portions toward the bottom panel center, at substantially right angles relative to said distal end panels, substantially simultaneously folding said end panels at substantially right angles relative to said bottom panel, applying adhesive to portions of the opposed edges of the top-cover bottom surface, ironing said cover over said end panel distal flap portions whereby wrinkles are removed and opposed edge portions of said cover become adhesively secured to said end distal flap portions, and folding and tucking said top cover distal flap portion under a distal edge portion of said bottom panel.

5. In a package forming apparatus drive assembly the combination comprising a drive shaft, a first ratchet drive gear mounted on said shaft, said first drive gear being rotatable relative to said drive shaft, means rotating said first drive gear in alternate directions of rotation, a second ratchet drive gear keyed to said drive shaft, drive pawl means connected to said first ratchet drive gear engaging and driving said second ratchet drive gear in the course of rotation of said first drive gear in one direction of rotation, an overtravel ratchet gear keyed to said drive shaft, fixedly mounted overtravel pawl means for stoppingly engaging said overtravel ratchet gear after the same has rotated through a predetermined angle of rotation, and overtravel pawl means disengagement means connected to said first drive gear for disengaging said overtravel pawl means from said overtravel ratchet gear at the end portion of the non-driving rotary movement of said first drive gear and prior to the initial portion of the driving rotary movement of said first drive gear.

6. In a method for assembling a collapsible paperboard receptacle from a paperboard blank having fold lines defining a bottom panel, end panels connected to said bottom panel with end panel distal flap portions integrally formed with said end panels and a top cover having a top cover distal flap portion integrally formed with said top cover; said top cover being hingedly connected to one edge of said bottom panel transversely disposed to said end panels; the steps comprising reinforcing opposed end portions of said bottom panel adjacent the fold lines defining the bottom panel and end panel connections so as to prevent folding along said latter fold lines, inwardly folding said end panel distal flap portions relative to said end panels, terminating reinforcing of the opposed end portions of the bottom panel adjacent the bottom panel-end panel hinged connections after the initial inward folding of said end panel flap portions has been effected, and folding said end panel portions at substantially right angles relative to said bottom panel.

7. The method of claim 6 in combination with the steps of ironing said top cover over said end panel distal flap portions and folding said cover distal flap relative to said top cover and tucking said top cover distal flap portion under a distal edge portion of said bottom panel.

8. In an apparatus for forming a paperboard blank into a package, the combination comprising first conveying means for moving said blank along a first predetermined path, reciprocally movable platform means disposed adjacent the terminal end of said first conveying means for receiving said blank, said platform being movable in substantially the vertical plane, folding means supported on opposite portions of said platform means, said folding means engaging opposed end portions of said blank and inwardly bending each of said end portions into vertical end wall and inwardly disposed end flap portions in the course of the downward portion of platform reciprocal movement, means pivotally mounted above said platform means having end portions engaging top surface portions of said end flap portions for retaining said blank end portions in folded position following said folding means folding operation, means operatively connected to said folding means for moving said folding means out of engagement with said folded blank end portions following engagement of the end retaining means with said folded end portions in the course of the upward portion of the platform reciprocal movement, fixedly positioned flap guide means positioned to engage top surface portions of said end flap portions at the end limit of said platform means upward portion of the reciprocal movement, and means disposed in the path of said retaining means movement for retracting said latter means from engagement with said end flap portions substantially simultaneously with the flap portions contact with said flap guide means.

9. In a method for assembling a collapsible paperboard receptacle formed from a paperboard blank having fold lines defining a bottom panel, end panels connected to said bottom panel, end panel distal flap portions connected to said end panels and a top cover having a top cover distal flap portion, said top cover being connected along one edge of said bottom panel and transversely disposed to said end panels, the steps comprising inwardly folding said end panel distal flap portions toward the bottom panel center at substantially right angles relative to said distal end panels, substantially concomitantly folding said end panel portions at substantially right angles relative to said bottom panel, ironing said cover over said end panel distal flap portions, folding said cover distal flap relative to said top cover and tucking said top cover distal flap portion beneath an underlying distal edge portion of said bottom panel.

10. In a package-forming process in which a paperboard blank having opposed arcuate fold lines defining end panels of arcuate peripheral configuration connected to a blank bottom panel and end panel distal flaps connected to said end panels, is folded into a configuration in which said bottom panel is formed integrally with opposed end panels of arcuate peripheral configuration substantially normally disposed thereto and end panel flaps inwardly disposed at right angles to the end panels with which formed, the steps comprising reinforcing said blank adjacent the fold lines defining the junctures of said end panels with said bottom panel so as to prevent folding along said latter fold lines and upwardly and inwardly folding said end and end flap portions as a unit whereby said blank end portions will fold first along the arcuate fold lines defining the junctures between said end flaps and said end panels in the course of folding along the arcuate fold lines defining the junctures between said end flaps and said end panels, removing the reinforcement adjacent the fold lines defining the junctures of said end panels with said bottom panel and folding said end panels relative to said bottom panel.

11. In an apparatus for folding a paperboard blank, the combination comprising a paperboard blank supporting means, pivot shaft means, means resiliently biasing said shaft means in a direction substantially transverse to the plane of said supporting means, folding plate means mounted on said shaft means and movable over at least a portion of said supporting means in the course of pivotal movement thereof, anvil means spaced from said shaft means and positioned to engage a distal edge of said plate means at the end limit of the pivotal movement thereof, motive means operatively connected to said folding plate means for initially pivotally moving said folding plate means about said shaft means until the distal edge of said plate means strikes said anvil means and for moving said resiliently biased shaft means following the latter anvil means engagement substantially transversely to said supporting means in opposition to the resiliently biasing means whereby the folding plate means distal edge may pivotally move over said anvil means during the end portion of said motive means movement.

12. In a blank folding apparatus, reciprocally movable first conveying means, receiving plate means for reciprocally moving a blank disposed at the end limit of said first conveying means movement, end fold means mounted on opposed end portions of said plate means, cam means disposed in the path of said end fold means for urging said fold means towards each other in the course of one direction of said plate means reciprocal movement, said end fold means being adapted to inwardly fold opposed end portions of a blank disposed on said plate means upon engaging said cam means, second conveying means for removing a blank disposed on said plate means from said plate means following reciprocal movement thereof, folding station means disposed at the end limit of the second conveying means movement for folding a portion of a blank means contiguous with an end folded portion of a blank means over an end folded blank portion, third conveyor means for moving a blank means disposed at said folding station means therefrom, following folding action thereof, and motive means for intermittently driving said third conveyor means operatively connected thereto.

13. A lid-fold plate assembly comprising a lid-fold breaker plate and an ironing plate having arcuate lateral cross-sectional configurations, means retaining said plates in juxtaposed parallel relationship, said retaining means comprising first and second pairs of parallel arms transversely disposed to said plates, rotatable means interconnecting the arms of said first pair at first end portions thereof and secured to said ironing plate at second end portions thereof, said lid-fold breaker plate being interposed between said rotatable means and said ironing plate, said second pair of arms being pivotally connected at first end portions thereof to said ironing plate means and longitudinally slotted at opposed end portions thereof, roller means rotatably mounted adjacent opposed end portions of said interconnecting means engaging the second arm pair slots, pivot shaft means resiliently biased downwardly, substantially transversely to said arm pairs, vertically elongate bearing means in which said pivot shaft means is mounted, said rotatable means being mounted on said pivot shaft means, and motive means operatively connected to said interconnecting means for rotatably moving said latter means and both of said plates about said pivot shaft.

14. In an apparatus for folding a paperboard blank, the combination comprising supporting plate means, pivoting shaft means, supporting bearing means for opposed portions of said shaft means, folding plate means pivotally mounted on said shaft means and movable over at least a portion of said supporting plate means in the course of pivotal movement, the connection between said bearing means and said shaft means being such that said shaft means and folding plate means are movable relative to said bearing means in a plane substantially normally disposed to said supporting plate means, anvil means spaced from said shaft means and positioned to engage a distal edge of said folding plate means at the end limit of the pivotal movement thereof, motive means operatively connected to said folding plate means for initially pivotally moving said folding plate means about said shaft means until the distal end of said plate means strikes said anvil means and for subsequently moving said folding plate means and shaft means substantially transversely to the plane of said supporting plate means along said bearing means whereby the distal edge of said folding plate means may pivotally move over said anvil means during the end portion of said motive means movement.

15. In an apparatus for folding a paperboard blank lid flap relative to a lid contiguous therewith and tucking the same beneath an underlying bottom panel edge portion of the blank, the combination comprising support means having a substantially straight distal edge for supportingly engaging a paperboard blank lid portion contiguous with a lid flap portion extending outwardly beyond said distal edge, tucker bar means disposed substantially parallel to said lid flap for bending said lid flap portion relative to the lid with which integrally formed and tucking the same beneath the distal edge of said support means and bottom panel edge portion disposed thereon, said tucker bar means having a substantially centrally disposed longitudinal slot disposed along one face thereof disposed in the direction of said support means, pivotally movable tucker arm means supporting said tucker bar means which is pivotally mounted thereon, first resilient means connected to said arm means biasing said arm means to pivot away from said support means, second resilient means weaker than said first resilient means connected to said tucker bar means for biasing the slotted face of said tucker bar means to pivot away from said support means, and cam means operatively connected to said tucker bar means opposing the biasing action of said second resilient means and regulating the pivotal disposition of said tucker bar means relative to said arm means on which mounted between two fixed end limits of pivotal movement, said cam means working in opposition to said first resilient means after said tucker bar means has reached the end limit of pivotal movement in the direction of said support means whereby said tucker bar means and tucker arm means are pivotally moved as a unit by said cam means toward said support means.

16. In a lid tuck fold station a supporting member having a substantially straight distal edge, guide means disposed adjacent and parallel to said distal edge, said guide means being reciprocally movable relative to said distal edge, tucker bar means having a slotted face disposed in the general direction of said supporting member, pivotally mounted arm means reciprocally movable toward and away from said support means, said tucker bar means being pivotally mounted on said arm means, first cam means operatively connected to said tucker bar means for regulating the angular disposition of said tucker bar means relative to said arm means between two end limits of pivotal movement and for regulating the angular disposition of said arm means after said tucker bar means has reached one end limit of its pivotal movement, second cam means operatively connected to said guide means for moving the same from the path of said tucker bar means and arm means as said arm means pivots in the direction of said support means, cam follower means supported by said arm means, and third cam means engaging said cam follower means, said third cam means being connected with said first cam means so as to be movable therewith, said third cam means regulating pivotal movement of said arm means whereby pivotal movement of said arm means is possible only when said first cam means is in a predetermined position relative to said tucker bar means to which operatively connected.

17. In an apparatus for forming a paperboard blank into a package, the combination comprising blank-supporting plate means reciprocally movable in substantially the vertical plane, folding finger means pivotally mounted on opposed portions of said plate means, motive means for reciprocally moving said plate means operatively connected thereto, means sensitive to the presence of a paperboard blank on said plate means positioned so as to be engaged by a blank disposed on said plate means for assisting in actuating said motive means, hold-down finger means mounted over said plate means having portions movable into operative positions in close overlying relation with portions of said reciprocally movable plate means disposed inwardly of each of said finger means, means supporting said hold-down finger means for moving the same into operative position in the course of said plate means downward movement, means for pivotally moving said folding finger means into operative position in the course of the downward movement of said reciprocally movable plate means disposed in the path of said folding finger means, latch means mounted adjacent said hold-down finger means for retaining said hold-down finger means in operative position until the initial portion of said folding finger means movement is completed, and means disposed in the path of said latch means movement for removing said latch means from the finger-retaining position before the completion of said folding finger means movement.

18. In a process for folding a blank cover into overlying relationship with a blank base connected thereto by means of a fold line, said blank base having opposed upstanding end panels of arcuate peripheral configuration, each of said end panels having an inwardly disposed end flap adapted to engage a lateral edge portion of said cover overlying said base, the steps comprising urging said cover into overlying engagement with said end flaps, urging an end portion of said cover oppositely disposed to the fold line connection with said blank base against a stop surface supporting the edge of said blank base oppositely disposed to said fold line connection with said cover whereby said cover end portion is forced into overlying relationship with said blank base edge and stop surface, and imparting an axial thrust to said cover, in a direction opposed to said fold line connection with said base, over said stop surface whereby said cover is pulled tautly over said end panel flaps.

19. In a process for packing stiff strips of a comestible on a blank having opposed fold lines defining end panels connected to a blank bottom panel and a cover panel connected to a portion of said blank bottom panel interposed between said end panels, and in which said blank bottom panel has a length at least as great as said strips; the steps comprising folding said end panels along fold lines formed with said blank bottom panel, into parallel relationship at substantially right angles to said bottom panel, concomitantly repositioning any of said stiff strips disposed on the end panel fold lines between said end panels whereby none of said strips is folded, and folding said cover panel over said blank bottom panel and said end panels.

20. In a process for packing stiff strips of a comestible on a blank having fold lines defining a bottom panel, end panels connected to said bottom panel with end panel distal flap portions integrally formed with said end panels and a top cover having a distal flap portion; said top cover being hinged along one edge of said bottom panel and said strips being of lesser length than the interval between said end panels; the steps comprising inwardly folding said end panel distal flap portions relative to said end panels, folding said end panels into parallel relationship at substantially right angles to said bottom panel, concomitantly repositioning any of said stiff strips which may be disposed on a blank-end panel fold line between said end panels whereby none of said strips is folded; folding said cover panel over said blank bottom panel and said end panel distal flap portions, and tucking said cover distal flap portion under said bottom panel.

References Cited in the file of this patent

UNITED STATES PATENTS

| | | |
|---|---|---|
| 1,911,212 | Stokes | May 30, 1933 |
| 2,251,670 | Forst | Aug. 5, 1941 |
| 2,449,334 | Smith | Sept. 14, 1948 |
| 2,832,270 | Pierce | Apr. 29, 1958 |
| 2,941,340 | Potts | June 21, 1960 |